US011752651B2

(12) United States Patent
Sonnenberg et al.

(10) Patent No.: US 11,752,651 B2
(45) Date of Patent: Sep. 12, 2023

(54) CUTTING-EDGE STRUCTURES AND METHOD OF MANUFACTURING CUTTING-EDGE STRUCTURES

(71) Applicants: The Gillette Company LLC, Boston, MA (US); Massachusetts Institute of Technology, Cambridge, MA (US)

(72) Inventors: Neville Sonnenberg, Newton, MA (US); Abhinav Rao, Cambridge, MA (US); Anastasios John Hart, Waban, MA (US); Paul Kitchen, Candia, NH (US)

(73) Assignees: The Gillette Company LLC, Boston, MA (US); Massachusetts Institute of Technology, Cambridge, MA (US)

( * ) Notice: Subject to any disclaimer, the term of this patent is extended or adjusted under 35 U.S.C. 154(b) by 676 days.

(21) Appl. No.: 16/711,539

(22) Filed: Dec. 12, 2019

(65) Prior Publication Data
US 2020/0189137 A1 Jun. 18, 2020

Related U.S. Application Data

(60) Provisional application No. 62/780,141, filed on Dec. 14, 2018.

(51) Int. Cl.
*B26B 21/58* (2006.01)
*B26B 21/40* (2006.01)
(Continued)

(52) U.S. Cl.
CPC .......... *B26B 21/58* (2013.01); *B26B 21/4068* (2013.01); *B29C 33/005* (2013.01);
(Continued)

(58) Field of Classification Search
CPC .............. B26B 21/4068; B29C 33/005; B29C 2037/92; B29L 2031/7186
See application file for complete search history.

(56) References Cited

U.S. PATENT DOCUMENTS 3,499,188 A 3/1970 Johnson
3,894,337 A 7/1975 Jones
(Continued)

FOREIGN PATENT DOCUMENTS

DE 1157767 B 11/1963
DE 3035814 A1 4/1982
(Continued)

OTHER PUBLICATIONS

European search report dated Apr. 21, 2020.
(Continued)

*Primary Examiner* — Jacob T Minskey
*Assistant Examiner* — Adrien J Bernard
(74) *Attorney, Agent, or Firm* — Joanne N. Pappas; Kevin C. Johnson

(57) ABSTRACT

A novel cutting-edge structure and method and apparatus for manufacturing the cutting-edge structure is provided. The cutting-edge structure is comprised of naturally derived or renewable material at greater than 50% by volume fraction. In one embodiment, the naturally derived material is a cellulose nanostructure such as a cellulose nanocrystal. The cellulose nanocrystal is processed using a base or mold structure to provide a cutting edge of any shape such as linear or circular edge structures. The process includes dual cure steps to produce an optimal cutting-edge structure without shrinkage. The formed cutting-edge structure can be utilized as a razor blade as it is formed with very sharp tip and edge suitable for cutting hair. The base structure can form one or more cutting-edge structures simultaneously.

20 Claims, 19 Drawing Sheets

(51) Int. Cl.
    *B29C 35/08*     (2006.01)
    *B29C 39/00*     (2006.01)
    *B29C 39/02*     (2006.01)
    *C08L 1/02*     (2006.01)
    *C08L 63/00*     (2006.01)
    *C08J 5/04*     (2006.01)
    *B29C 43/02*     (2006.01)
    *B29C 33/00*     (2006.01)
    *B29C 37/00*     (2006.01)
    *B29C 33/56*     (2006.01)
    *B29K 1/00*     (2006.01)
    *B29K 105/00*     (2006.01)

(52) U.S. Cl.
    CPC .......... *B29C 33/56* (2013.01); *B29C 35/0805* (2013.01); *B29C 37/0067* (2013.01); *B29C 39/006* (2013.01); *B29C 39/026* (2013.01); *B29C 43/021* (2013.01); *B29C 43/027* (2013.01); *C08J 5/045* (2013.01); *C08L 1/02* (2013.01); *C08L 63/00* (2013.01); *B29C 2035/0827* (2013.01); *B29C 2037/92* (2013.01); *B29C 2043/029* (2013.01); *B29K 2001/00* (2013.01); *B29K 2105/0061* (2013.01)

(56) References Cited

U.S. PATENT DOCUMENTS

| | | | |
|---|---|---|---|
| 6,271,297 | B1 | 8/2001 | Ishida |
| 6,389,699 | B1 | 5/2002 | Ecer |
| 8,648,132 | B2 | 2/2014 | Fleischer et al. |
| 2002/0028857 | A1 | 3/2002 | Holy |
| 2005/0137303 | A1 | 6/2005 | Shelby et al. |
| 2007/0087078 | A1* | 4/2007 | Bruening ................ B29C 45/02 |
| 2007/0252304 | A1 | 11/2007 | Pennington et al. |
| 2008/0086888 | A1 | 4/2008 | Scheinfeld |
| 2010/0196611 | A1 | 8/2010 | Phonthammachai et al. |
| 2012/0311865 | A1 | 12/2012 | Hamilton et al. |
| 2013/0264732 | A1* | 10/2013 | Youngblood ........... C08B 15/08 264/28 |
| 2014/0127017 | A1 | 5/2014 | Virtanen et al. |
| 2014/0377797 | A1 | 12/2014 | Patel |
| 2017/0001324 | A1 | 1/2017 | Gester et al. |
| 2017/0001325 | A1 | 1/2017 | Gester et al. |
| 2017/0368703 | A1 | 12/2017 | Gester et al. |
| 2017/0368704 | A1 | 12/2017 | Gester et al. |
| 2018/0333898 | A1 | 11/2018 | Francis |
| 2019/0345313 | A1 | 11/2019 | Feng et al. |
| 2020/0131326 | A1 | 4/2020 | Chazot et al. |
| 2020/0189131 | A1 | 6/2020 | Sonnenberg et al. |
| 2020/0189138 | A1 | 6/2020 | Sonnenberg et al. |
| 2020/0391305 | A1 | 12/2020 | Tsukihara et al. |

FOREIGN PATENT DOCUMENTS

| | | |
|---|---|---|
| JP | 2008292313 A | 12/2008 |
| JP | 2018058130 A | 4/2018 |

OTHER PUBLICATIONS

All Office Actions; U.S. Appl. No. 16/711,520.
All Office Actions; U.S. Appl. No. 16/711,524.
Extended European Search Report and Search Opinion; Application No. 19215607.3-1014; dated Apr. 23, 2020; 5 pages.
Extended European Search Report and Search Opinion; Application No. 19215610.7-1014; dated Apr. 21, 2020; 7 pages.

* cited by examiner

TO FIG. 12B

CUTTING-EDGE STRUCTURES AND METHOD OF MANUFACTURING CUTTING-EDGE STRUCTURES

CROSS-REFERENCE TO RELATED APPLICATION

The present invention is related to U.S. application Ser. No. 16/711,524, and U.S. application Ser. No. 16/711,539, filed on the same date Dec. 12, 2019, as the present application, and U.S. application Ser. No. 62/780,187 filed on Dec. 14, 2018. "Systems, Devices, and Methods for Bulk Processing of Highly-Loaded Nanocomposites," incorporated herein in its entirety, including specification and drawings.

FIELD OF THE INVENTION

This invention relates to shaving razors and methods of manufacturing cutting-edge structures, and more particularly to manufacturing cutting-edge structures such as shaving razor blades from naturally derived, renewable, or biodegradable materials.

BACKGROUND OF THE INVENTION

Razor blades are typically formed of a suitable metallic sheet material such as stainless steel, which is slit to a desired width and heat-treated to harden the metal. The hardening operation utilizes a high temperature furnace, where the metal may be exposed to temperatures greater than about 1000° C. for up to about 20 seconds, followed by quenching, whereby the metal is rapidly cooled to obtain certain desired material properties.

After hardening, a cutting-edge is formed generally by grinding the blade. The steel razor blades are mechanically sharpened to yield cutting-edges that are sharp and strong to cut through hair over an extended period of time. The continuous grinding process generally limits blade shapes to have straight edges with a substantially triangular or wedge-shaped profile (e.g., cross section). The cutting-edge wedge-shaped configuration typically has an ultimate tip with a radius less than about 1000 Angstroms.

The advantage of this prior art method is that it is a proven, economical process for making blades in high volume at high speed. It would be particularly desirable if such a process could utilize lower cost materials for blade formation and also enable other cutting-edge profiles.

Blades with cutting-edges made from a polymeric material are disclosed for disposable cutlery or disposable surgical scalpels (e.g., U.S. Pat. Nos. 6,044,566, 5,782,852). Razor blades made from polymeric material are disclosed in GB2310819A, and US20470001325A1. The disadvantages of the prior art relating to polymer blades include difficulty in obtaining desired mechanical properties in conventional polymeric material and that the polymeric blades are not comprised of materials that are substantially derived from or comprised of, naturally derived, renewable or biodegradable sources or materials.

Consumers, industry, and government are increasingly demanding products made from renewable and sustainable resources that have one or more of the following beneficial attributes: biodegradable, non-petroleum based, carbon neutral, and having low environmental, animal/human health and safety risks. The advantage to having blades made from novel materials that are sustainable or renewable is the beneficial impact to the environment, where instead of filling up landfills, these products are easily disposed due to their ability to break down in the earth or their ability to be recycled.

Therefore, there is a need to produce a razor blade cutting edge that is substantially renewable and that is also suitable (e.g., sharp enough) to cut hair (e.g., a cutting-edge having a tip radius of less than 1 μm as required for cutting hair).

A need exists for improved processes for cutting-edge structures comprised of naturally derived polymers and more cost-effective methods of making cutting-edge structures for shaving razors having required tip radius, optimal edge quality and sharpness to provide a comparable or improved shaving experience.

It is also desirable to find materials and processes that can form cutting-edge structures having any shape, such as non-linear edges and/or provide an integrated razor assembly.

SUMMARY OF THE INVENTION

The present invention provides a simple, efficient method for manufacturing, including molding, one or more cutting-edge structures, such as razor blades from a renewable or sustainable material and a functional cutting-edge structure such as a razor blade. Moreover, some methods are suitable for producing a plurality of such cutting-edge structures, or "blade boxes" comprising a plurality of razor blades formed of this naturally derive, renewable, or biodegradable cutting-edge structure material to be disposed as a single unit in a razor cartridge.

In one aspect, the method for manufacturing at least one cutting-edge structure includes providing the steps of:
 a. providing a base structure having a first and a second portion;
 b. providing one or more physical gels;
 c. curing the one or more physical gels to form one or more chemical gels;
 d. inserting the one or more chemical gels into the first portion of the base structure;
 e. curing the one or more chemical gels one or more times, forming a dried chemical gel;
 f. contacting the dried chemical gel with the second portion of the base structure;
 g. forming the cutting-edge structure during the contacting step.

The physical gel includes a naturally derived material.

In another aspect, the physical gel includes one or more naturally derived materials, renewable materials, biodegradable materials, one or more solvents, at least one polymeric material, or any combination thereof.

The one or more naturally derived materials include cellulose nanostructures. The cellulose nanostructures include cellulose nanocrystals. The one or more solvents include an organic material. The organic material includes dimethylformamine. The cellulose nanostructures include naturally derived materials.

In another aspect, the at least one polymeric material includes one or more epoxides. Further, the step of curing the one or more chemical gels includes evaporation of the one or more solvents; the step of contacting the dried chemical gel with the second portion further includes contacting the first portion of the base structure.

The step of contacting the dried chemical gel includes a line contact at an interface of the first and second portions of the base structure.

The curing steps include heat, light, or a combination thereof. The light includes ultra-violet (UV) light. The physical gel further includes one or more cross-linkers, one or more photo-initiators, or any combination thereof. The one or more photo-initiator includes an ultra-violet light curing photo-initiator. The heat includes a thermal cross-linker comprising polyamine. The ultra-violet light curing photo-initiator includes an epoxide.

In a further aspect, the step of curing the one or more physical gels to form one or more chemical gels includes repeating the step of providing one or more physical gels and the step of curing the one or more physical gels to form one or more chemical gels.

In yet a further aspect, the step of curing the one or more chemical gels includes curing at a temperature up to about 50 degrees Celsius to about 100 degrees Celsius for a first duration and curing at a temperature up to about 120 degrees Celsius to about 180 degrees Celsius for a second duration.

Still further, the method further includes the step of releasing the cutting-edge structure from the base structure and a step of inserting the cutting-edge structure into a razor cartridge, a blade box, a frame, or any combination thereof.

In a still further aspect, the formed cutting-edge structure includes a circular or linear shape and a brown color. Still another aspect, the cellular nanocrystals are aligned vertically, horizontally, or in a mixed manner within the cutting-edge structure.

In another embodiment of the present invention, a cutting-edge structure includes one or more naturally derived materials. The cutting-edge structure may also include one or more solvents, one or more renewable materials, one or more biodegradable materials, one or more polymeric materials, or any combinations thereof.

The one or more naturally derived materials include cellulose nanostructures, wherein the cellulose nanostructures are cellulose nanocrystals. The one or more solvents include an organic material. The organic material includes dimethylformamine. The at least one polymeric material includes one or more epoxides.

In another aspect, the cutting-edge structure includes a brown color, and a shape that is circular, linear, or any combination thereof. In still other aspects, 100% of the cutting-edge structure is comprised of the one or more naturally derived materials by volume fraction, 100% of the cutting-edge structure is comprised of one or more renewable sources by volume fraction, about 50% to about 100% of the cutting-edge structure is comprised of naturally derived materials by volume fraction, about 50% to about 100% of the cutting-edge structure is comprised of renewable materials by volume fraction, or about 50% to about 100% of the one or more naturally derived materials by volume fraction.

In another embodiment, the one or more naturally derived materials include a majority of the cutting-edge structure by volume fraction. The cutting-edge structure includes a tip radius of less than about 1 um. The cutting-edge structure is biodegradable.

In a third embodiment of the present invention, an apparatus for manufacturing at least one cutting-edge structure comprises a first portion and a second portion and one or more naturally derived materials. In one aspect, one of the portions includes a cylindrical shape.

The first portion is a plunger structure and the second portion is a cavity structure. The plunger structure further includes a plunger element and a plunger body. The plunger structure further includes a relief portion wherein the relief portion is disposed between the plunger body and the plunger element. The relief portion enables a point or line contact between a plunger structure and a cavity structure to mold the naturally derived material into a cutting-edge structure. The plunger structure further includes an angled surface. At least a portion of the plunger structure includes a cylindrical shape.

In a further aspect, the plunger structure comprises one or more lubricious materials, one or more plastic materials, one or more metals, or any combinations thereof. The lubricious material includes Teflon.

Still further, the cavity structure includes an aperture. The aperture extends through the cavity structure. The cavity includes a circular shape. The cavity structure includes angled surfaces. The first portion, the second portion, or both the first portion and second portion include one or more lubricious materials, one or more plastic materials, one or more metals, or any combinations thereof. The lubricious material of the cavity structure includes Teflon.

The present invention step of curing includes cross-linking or polymerization and the curing step is mediated via heat, light, such as UV light, or a combination thereof.

In still yet another aspect of the invention, the at least one cutting-edge structure formed using the method herein is a razor blade or a portion of a blade box and the razor blade or the blade box is secured into a razor cartridge housing or frame. The blade box may be comprised of different types of cutting-edge structures.

Another embodiment of the present invention includes a blade box comprising at least one cutting-edge structure, at least one non-cutting-edge structure coupled to said at least one cutting-edge structure, both the cutting and non-cutting-edge structures comprised of a renewable material such as a cellulose nanostructure material.

The details of one or more embodiments of the invention are set forth in the accompanying drawings and the description below. Other features, objects, and advantages of the invention will be apparent from the description and drawings, and from the claims.

DETAILED DESCRIPTION OF THE DRAWINGS

FIG. 1 depicts a desired sustainable cutting-edge material of the present invention, namely a cellulose nanostructure.

FIGS. 2A, 2B, and 2C depicts the chemical and physical structure of the cellulose nanostructure of the present invention.

FIGS. 3A, 3B, and 3C depict exemplary illustrations of microstructural arrangements of cellulose nanocrystals in razor blade embodiments of the present invention.

DETAILED DESCRIPTION OF THE INVENTION

The present invention provides for cutting-edge structures (e.g., razor blades which may be used in shaving devices or razors) and methods for manufacturing cutting-edges or razor blades for shaving devices comprising naturally derived materials comprising nanostructures.

The cutting-edge structures of the present invention are substantially formed from naturally derived, renewable, or biodegradable materials.

As used herein, "renewable" is a term that generally signifies a renewable resource is one which can be replaced naturally in a relatively short time or replenished with time, like the growth of new organisms or the natural recycling of materials. Literally the term means to make new again. Renewable resources do not have a fixed quantity—more can always be generated. For instance, wood from managed softwood forests is renewable, because these trees can be regrown in a few years.

The term "substantially" as used herein signifies to a great or significant extent.

The term "sustainable" as used herein, signifies of, relating to, or being a method of harvesting or using a resource so that the resource is not depleted or permanently damaged. If the rate of use of a source exceeds the rate of renewal (e.g., the source is used more than it is being recreated), its continued use will become unsustainable.

The term "biodegradable," as used herein, signifies that a substance or object is capable of being decomposed by bacteria or other living organisms. Biodegradable substances include food scraps, cotton, wool, wood, human and animal waste, manufactured products based on natural materials (such as paper, and vegetable-oil based soaps).

The term "naturally derived," as used herein, indicates that some or all ingredients are derived from nature that have been used to create a product, the latter in and of itself not originally occurring or formed in nature.

The materials of the present invention preferably comprise nanostructures. Cellulose nanocrystals are an example of a naturally derived, widely available, biodegradable nanostructure with optimal mechanical properties. Other nanostructures contemplated in the present invention include but are not limited to, carbon nanotubes, graphene oxide, or ceramic based materials, which are generally not considered naturally derived materials.

In a preferred embodiment of the present invention, the razor blade is formed from cellulose, cellulose-based particles and cellulose-based composites.

Figure 1:
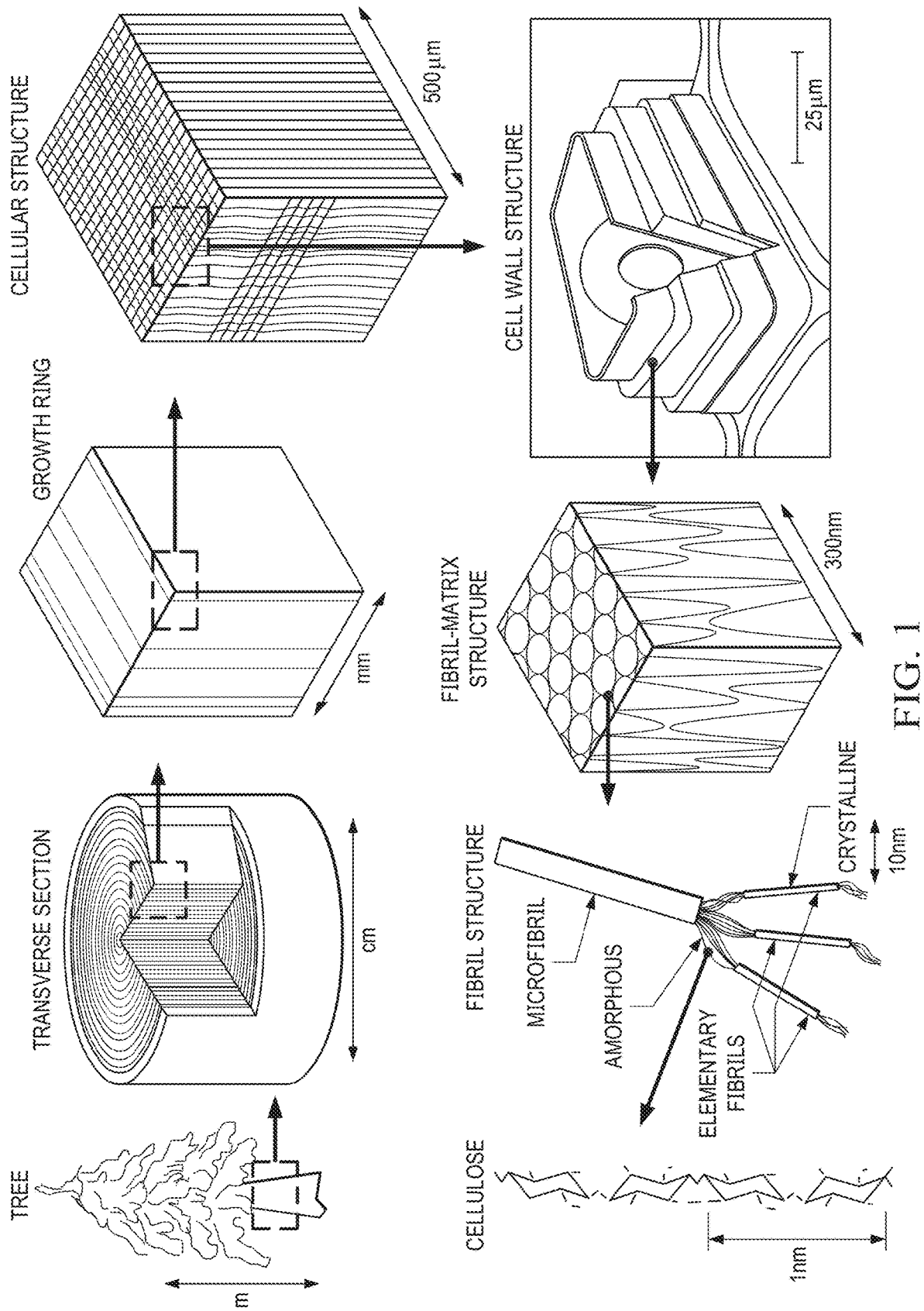

As used herein, "cellulose nanocrystals" or "CNC" signify nanomaterials derived from a cellulose. Cellulose nanocrystals, primarily obtained from naturally occurring cellulose fibers, are biodegradable and renewable in nature. For instance, cellulose material can readily be extracted from wood, hemp, cotton, linen, and other sources. The term "cellulose nanostructure" as used herein may include but is not limited to cellulose nanocrystal materials. As shown in FIG. 1, cellulose nanostructure of the present invention can be extracted from trees.

Accordingly, they serve as a renewable, sustainable and/or environmentally friendly material in the present invention as razor blades are generally disposed of after one or several uses.

The nanostructures of the present invention, such as cellulose nanocrystals or CNCs, have significant advantageous properties including mechanical and chemical properties. For instance, in some instances, it has been determined that individual cellulose nanocrystals (CNCs) have a Young's modulus of 150 GPa. With diameters and lengths on the order of 10 nm and 100 nm respectively, the materials of the present invention produce nanocomposites with nanoscale features such as a razor blade cutting-edge structure. In contrast, the materials of the prior art such as conventional micron-scale fillers and metal powders, cannot produce features with nanoscale dimensions having optimal mechanical and chemical attributes.

Figure 2A:
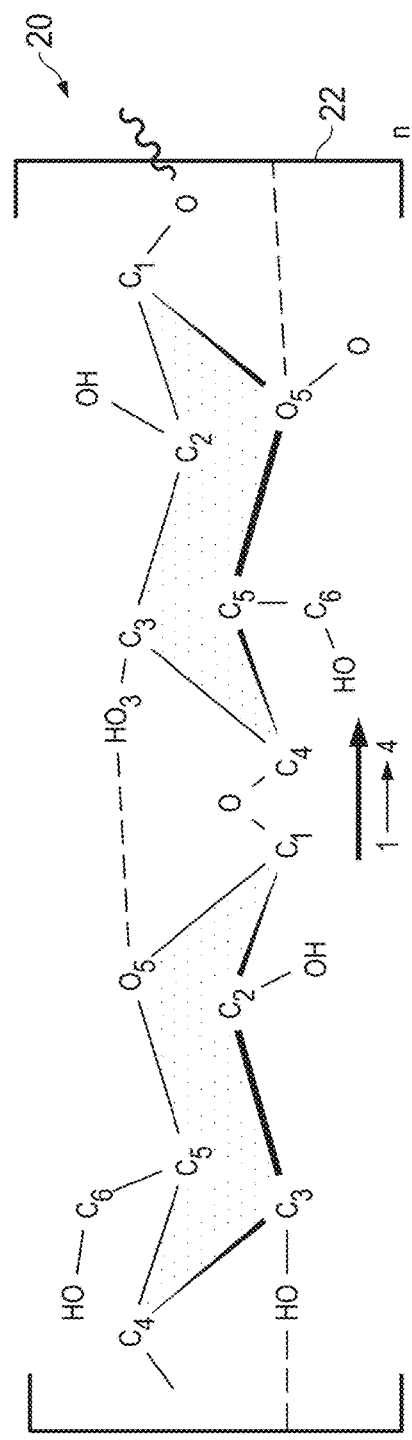
Figure 2B:
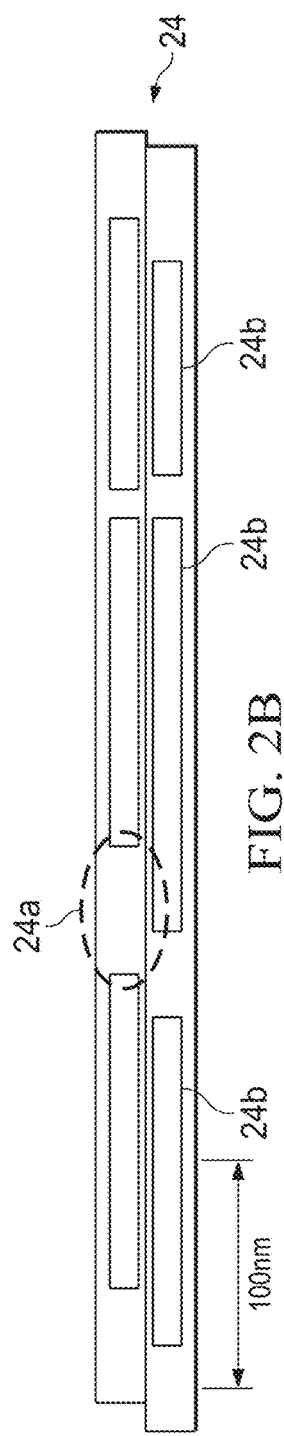
Figure 2C:
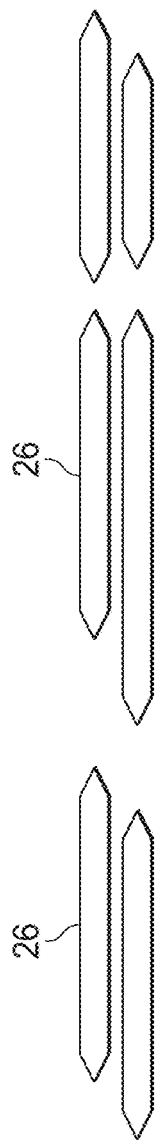

Aspects of a cellulose nanostructure 20 of the present invention are shown in FIG. 2. The chemical structure of a cellulose chain 22 is depicted in FIG. 2(a) having a pyranose ring with bonds. A cellulose microfibril 24 is depicted in FIG. 2(b) having disordered regions 24a and crystalline regions 24b. Cellulose nanocrystals 26 are depicted in FIG. 2(c). Cellulose nanocrystals are generally long, thin and slightly oval shaped. This general shape is conducive to fabricating razor blade cutting edges as they can substantially fill in the area underneath wedge shaped tip.

Figure 3A:
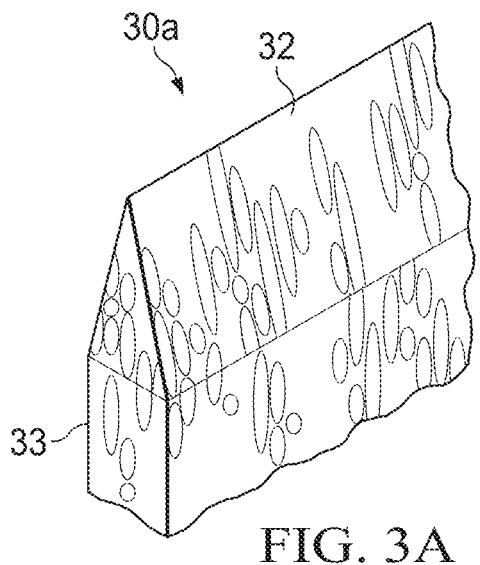
Figure 3B:
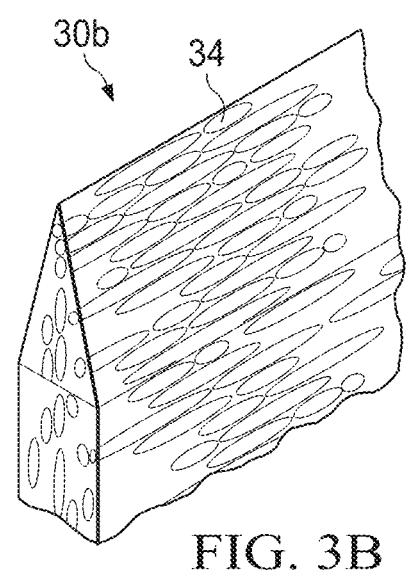
Figure 3C:
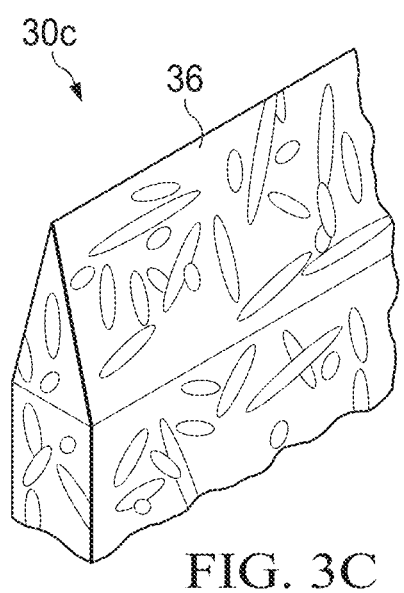

Exemplary illustrations of a razor blade or formed cutting-edge structure comprised of filled in cellulose nanostructures of the present invention is shown in FIGS. 3A, 3B, and 3C. In any of these embodiments, an electric or magnetic field can be applied in the process of manufacturing or molding cutting-edge structure or near the tip of the cutting-edge structure so as to cause the nanostructures (e.g., cellulose nanocrystals or CNCs) to become concentrated at the tip or near the interface of the gel and base structure of the present invention.

As can be seen in FIG. 3A, a razor blade cutting edge 30a of the present invention has cellulose nanostructures 32 vertically arranged within the razor blade cutting-edge structure. Cellulose nanostructures 32 provide a robust cutting edge in that the vertical arrangement of the nanostructure provides shaving advantages as the nanostructures are aligned along the direction of the shave and substantially parallel to the body 33 of the blade 30a.

In FIG. 3B, a razor blade 30b of the present invention has cellulose nanostructures 34 horizontally arranged within the razor blade cutting-edge structure. Cellulose nanostructures 34 provide a very sharp cutting edge in that the horizontal arrangement provides a highly filled area of nanostructures at the tip such that the tip is resistant to damage from shaving. In FIG. 3C, a razor blade 30c of the present invention has cellulose nanostructures 36 in a mixed or matrixed manner, some vertically aligned, some horizontally aligned, and some angled and oriented in various directions within the razor blade cutting-edge structure. Cellulose nanostructures 36 provides a very sharp and robust cutting edge in that the mixed arrangement of nanostructures provides stability at the tip.

The cutting-edge structures of the present invention may also be comprised of other nanostructures and polymers.

As used herein, a polymeric material signifies a material that is formed of a polymer, the latter being a large, chain-like molecule made up of monomers, which are small molecules. Generally, a polymer can be naturally occurring or synthetic. In the present invention, preferred embodiments comprise naturally occurring or semi-synthetic polymers as opposed to synthetic polymers.

The polymer materials of the present invention generally can occur in two forms or states. The first state may be a soft or fluid state and the second state may be a hard or solid state. Generally, polymers are molded or extruded when in the first state (e.g., liquid or soft) and subsequently formed into an object that is in a second state (e.g., hard or solid). In some instances, the material is reversible (e.g., a material in the second state can be converted back to its first state) while in others, the polymerization is irreversible (e.g., the material cannot be converted back to its first state).

For those polymeric materials where the second state is obtained from the first state via irreversible polymerization, the first state of the polymeric material may generally be thought of as being a "precursor" for the second state of the polymeric material. As such, in the present invention, a polymeric material may be generated from a precursor material or a material in a first state.

The materials that are generally desired for the present invention cutting-edge structures are materials in the first, soft or liquid, states which comprise monomers or short chain length (e.g., low molecular weight) polymers known as oligomers or both. Both monomers and oligomers are referred to herein as "precursors." These precursors are converted into long chain length polymeric material in the second, solid state through a polymerization or cross-linking process, herein referred to as a curing process. Curing the precursor material can generally be achieved under the influence of heat, light, ionic or high energy radiation, or any combination thereof. After curing, the solid material comprises multiple components including polymer.

The novel cutting-edge material of the present invention is comprised of several components. A first component is a naturally derived, renewable, or biodegradable material such as cellulose as described above. Preferably cellulose nanocrystals (CNCs) are utilized due to their desirable mechanical and chemical properties. An example of a preferred type of cellulose nanocrystal that can be utilized in the present invention is shown in FIG. 2A-2C.

A second component of the novel cutting-edge material of the present invention comprises a solvent. The solvent is preferably an organic solvent. Desirably, the solvent comprises components which are capable of dissolving polymers. In a preferred embodiment, the solvent comprises dimethylformamide. Dimethylformamide is an organic compound with the formula $(CH_3)_2NC(O)H$. The solvent, while present initially, will be removed and evaporated from the material to form a fully solid composite as will be described herein.

A third component of the novel cutting-edge material comprises one or more polymeric materials. The polymeric materials may comprise from about 10 percent to about 50 percent by weight of the composite of the cutting-edge material. The polymeric materials can be of any type including but not limited to, natural, synthetic or semi-synthetic polymers. In a preferred embodiment of the present invention, the polymeric component of the material of the present invention comprises epoxide. Some epoxides of the present invention can be obtained from naturally derived, renewable, or biodegradable sources.

Figure 11:
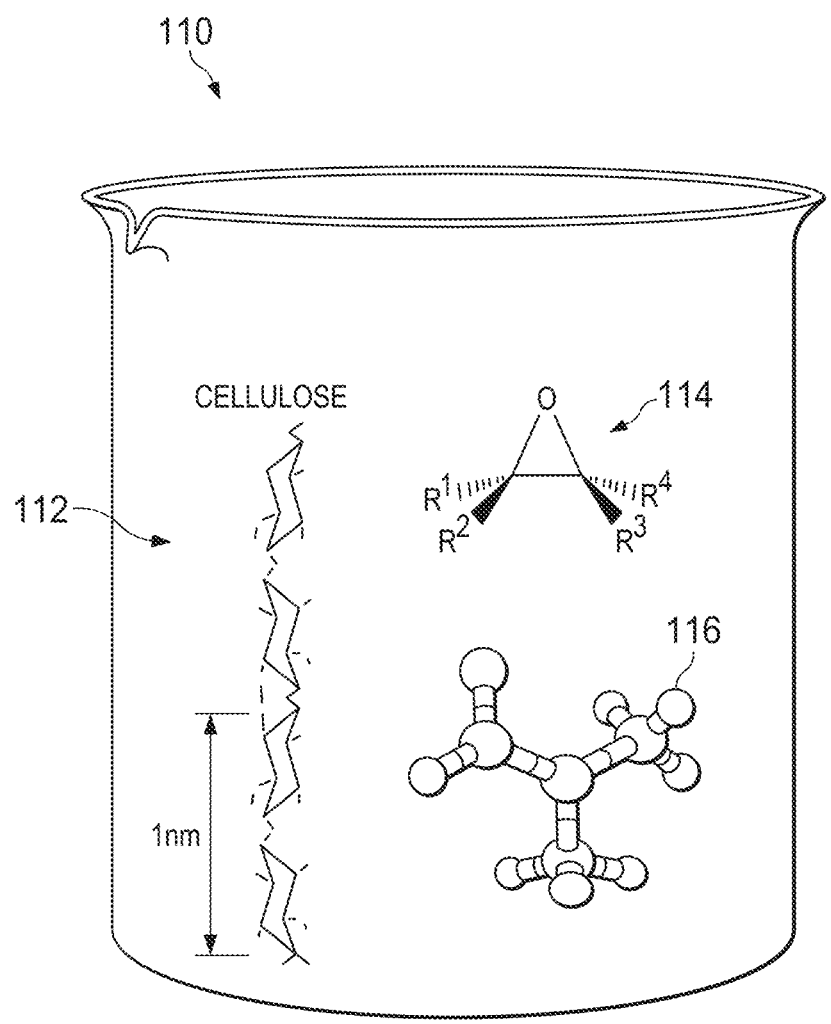
FIG. 11 depicts an embodiment of the cutting-edge material of the present invention comprising cellulose nanostructures, epoxide, and solvent.
Figure 12A:
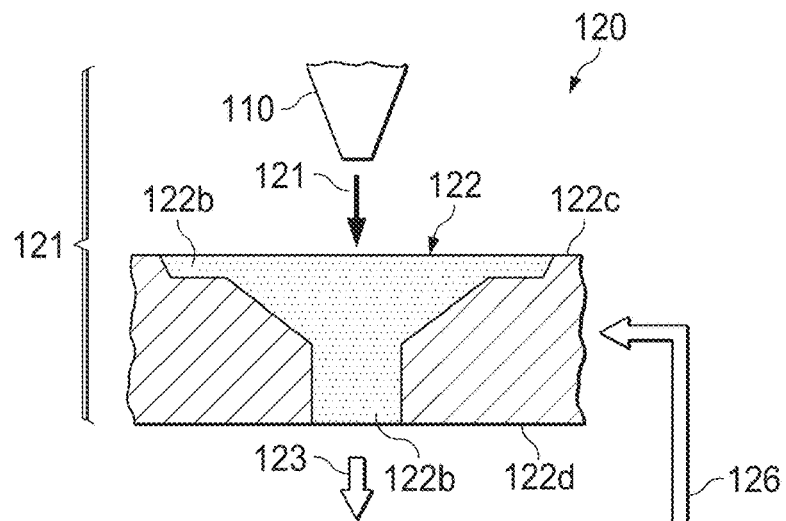
FIGS. 12A and 12B are flow diagrams of methods of manufacturing razor blades from the novel cutting-edge material, according to a preferred embodiment of the present invention.
Figure 12A:
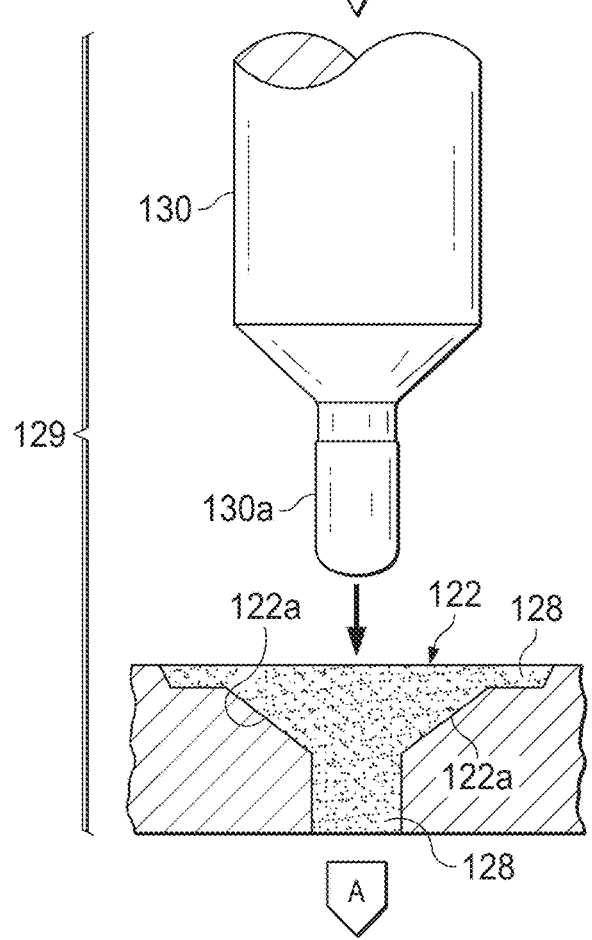

An exemplary embodiment of the cutting-edge material used in the process of making a cutting-edge structure of the present invention is depicted and described in conjunction with FIGS. 11 and 12.

The present invention contemplates that all (e.g., 100%) or substantially all, of the novel cutting-edge material is obtained from a naturally derived, renewable, or biodegradable source by volume fraction.

The present invention contemplates that at least about 50 percent to about 100 percent of the novel cutting-edge material is obtained from a naturally derived, renewable, or biodegradable source by volume fraction.

Desirably, about 90% of the cutting-edge structure is formed of a material that is obtained from a naturally derived, renewable, or biodegradable source by volume fraction.

In contrast, the prior art discloses low-volume fraction (e.g., less than about 50%) fillers in a matrix that are substantially obtained from non-naturally derived or non-renewable sources. A disadvantage of the prior art is that, due to kinetic arrest of nanoparticle suspensions, most conventional nanocomposites are restricted to polymer-reinforcement applications with these low volume fraction of nanoparticles. Larger nanoparticle-to-polymer ratios require addition of solvent to allow dispersion and processing, but present the challenge of large volumetric shrinkage associated with solvent evaporation.

The present invention comprises a formulation that allows nanoparticle-to-polymer ratios between about 50% to about 90%. As will be described herein, the present invention comprises a dual cure (e.g., UV and thermal) process which manages the solvent evaporation and shrinkage, enabling net-shape forming including sharp objects such as cutting-edge structures.

Mold Apparatus

The present invention comprises a base structure which is used to form the novel cutting-edge structures of the present invention using the cutting-edge material described herein.

Figure 4:
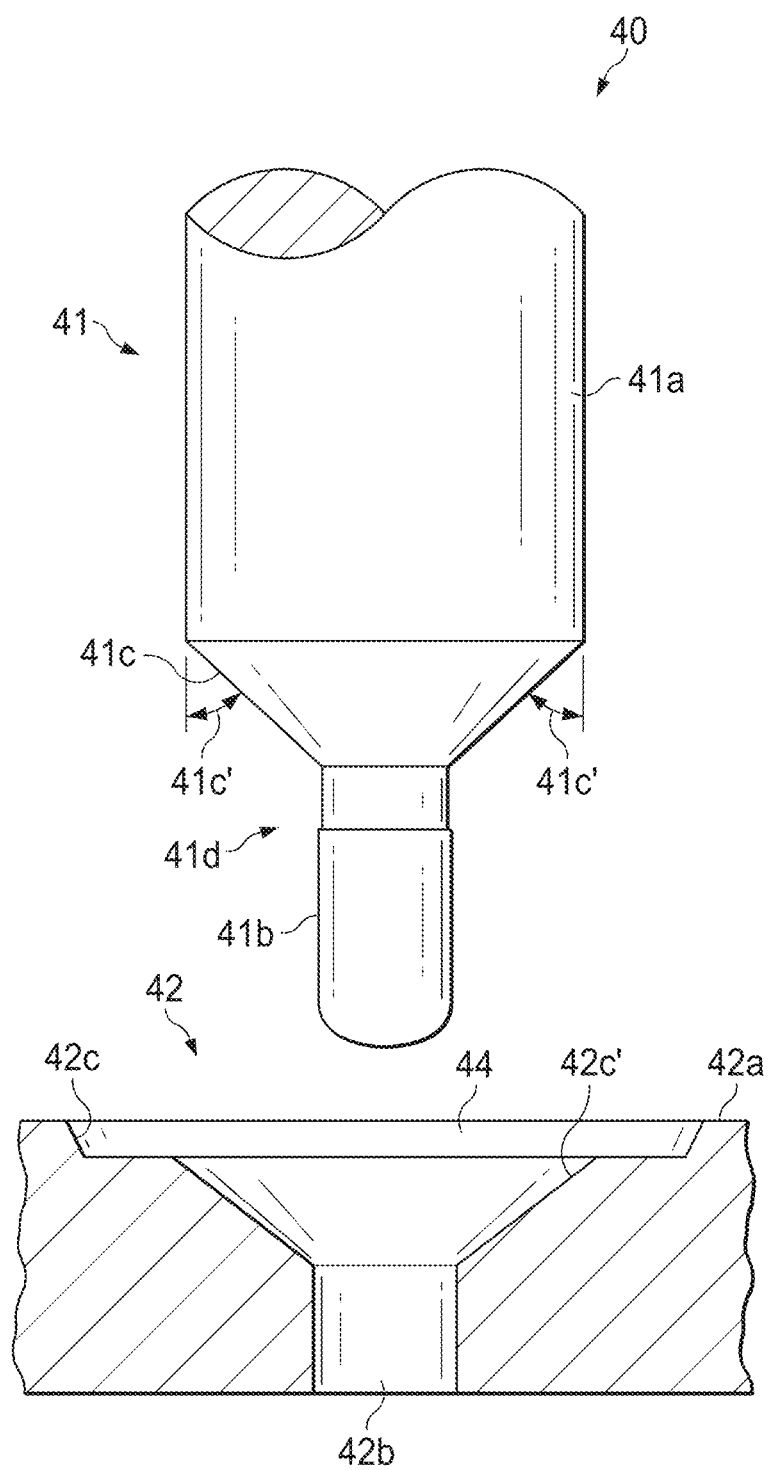
FIG. 4 depicts a schematic view of portions of a base structure of the present invention.

FIG. 4 depicts a cross-sectional view of base structure 40 used in the present invention. The base structure 40 in the present invention is utilized as a mold apparatus to form (or mold) a cutting-edge structure suitable for use in making a razor, razor blade or razor cartridge.

In one embodiment, a base structure 40, as shown in FIG. 4, comprises two parts, an upper portion 41 and a lower portion 42. In an alternate embodiment of the present invention (not shown), base structure 40 may be a single movable part or an integral part which cannot generally be split into further parts. However, as the contact between the upper and lower portion is a significant aspect of the present invention as will be described below, it may generally be more feasible to utilize a two part base structure.

The upper and lower portions 41 and 42 can be of any size, shape and dimension. In a preferred embodiment of the present invention shown in FIG. 4, the upper portion 41 comprises a plunger structure and the lower portion 42 comprises a cavity structure which the plunger structure of the upper portion mates with.

The plunger structure of the present invention can be comprised of any material, including, but not limited to, one or more lubricious materials, one or more plastic materials, one or more metals, low-coefficient of thermal expansion alloys such as Invar, metals coated with a polymer, such as PTFE, (e.g., often referred to as Teflon), or polypropylene or silicones, or any combinations thereof. In a preferable embodiment of the present invention, the plunger structure is preferably comprised of Teflon, or a Teflon-based, lubricious material. In an alternate preferred embodiment of the present invention, the plunger structure may also be comprised of a metal which is coated with a lubricious material, such as Teflon or a Teflon-based material. It is desirable that the entirety or at least a portion of the plunger structure of the base structure comprises a lubricious surface (e.g., Teflon coated) for the mold apparatus to perform optimally and in particular for a release or separation of the plunger structure from the cavity structure during the process.

The plunger structure of the present invention preferably has a generally cylindrical shape including a main body 41*a* and a plunger element 41*b*. The plunger structure 41 also desirably includes one or more angled surfaces 41*c* and one or more relief portions 41*d* preferably disposed between the main body 41*a* and the plunger element 41*b*.

The angles 41*c*' of the one or more angled surfaces 41*c* of the plunger structure can range from about 15 degrees to about 60 degrees, and more preferably, angle 41*c*' is about 21.5 degrees.

The relief portion 41*d* is shaped and sized sufficient to ensure a line contact at the interface 46 between the plunger structure 41 and the cavity structure 42. Generally, as shown in FIG. 4, the relief portion 41*d* comprises an intermediate neck-like structure between the plunger body and the plunger element, having smaller dimensions than either the plunger body or the plunger element. The plunger element 41*b* of the present invention may desirably have smaller dimensions than the plunger body but larger dimensions than the relief portion.

The plunger structure of the present invention preferably has any feasible dimensions to perform the manufacturing process of the present invention taking into account the dimensions of the desired cutting-edge structure (e.g., inner diameter of the cutting-edge structure), the setup of the base structure, and materials used for the plunger structure. The plunger structure can have any height. The height of a plunger structure in one embodiment of the present invention is about 50 mm. The plunger structure of the present invention may be hollow or solid. The plunger structure coupled to the cavity structure of the present invention is capable of providing an cutting-edge structure having a circular shape having a diameter of about 10 mm diameter or less, preferably about 3 mm, and desirably not more than about 0.5 mm.

The cavity structure of the present invention can be comprised of any material, including but not limited to, one or more plastic materials, one or more metals, one or more lubricious materials, or any combinations thereof. Other materials are also contemplated in the present invention including but not limited to, cermets which are generally a ceramic-metal composite (e.g., Tungsten Carbide/Cobalt). Such materials can also be coated with a lubriocious release agent like Teflon or silicones. In a preferable embodiment of the present invention, the cavity structure 42 is comprised of a metal material, desirably a material with a low coefficient of thermal expansion, such as aluminum, steel, or Invar material. In an alternate embodiment of the present invention, the cavity structure 42 may be comprised of a combination of materials. For instance, the cavity structure may be comprised of a metal material which includes a plastic material or a metal material which is coated with a plastic or lubricious material, such as a polypropylene or Teflon material, respectively.

The cavity structure of the present invention is desirably a rigid or semi-rigid structure so as to accommodate the force that will be applied from the upper portion 41 (e.g., the plunger structure), as will be described in more detail below.

The shape of the cavity structure of the present invention can be any shape including but not limited to a frustum shape such as a conical frustum, a trapezoidal frustum or a pyramidal frustum or a cylindrical or other three-dimensional shape. A cavity structure 42 of the present invention having a conical frustum shape is shown in FIG. 4.

Regardless of overall shape, the cavity structure 42 of the present invention preferably includes an aperture 44 extending from an upper surface or the top area 42*a* of the cavity structure 42 into at least a portion of, or all the way through, the internal area 42*b* of the cavity structure 42. The shape of aperture 44 at the upper surface of the cavity structure is preferably a circular or round shape and as it extends into the cavity structure it can comprise a cylindrical, spherical or any other feasible shape. The present invention contemplates that the shape of aperture 44 in the present invention is desirably substantially similar to that of the plunger element 41*b*. In this way, the plunger element 41*b* can be inserted into the aperture 44 of the cavity structure as shown in FIG. 1 in accordance with the present invention. In addition, the cavity walls 42*c* include one or more angled or slightly chamfered surfaces 42*c*' extending into the cavity structure to provide for ease in accommodating and mating with the plunger structure.

Figure 5:
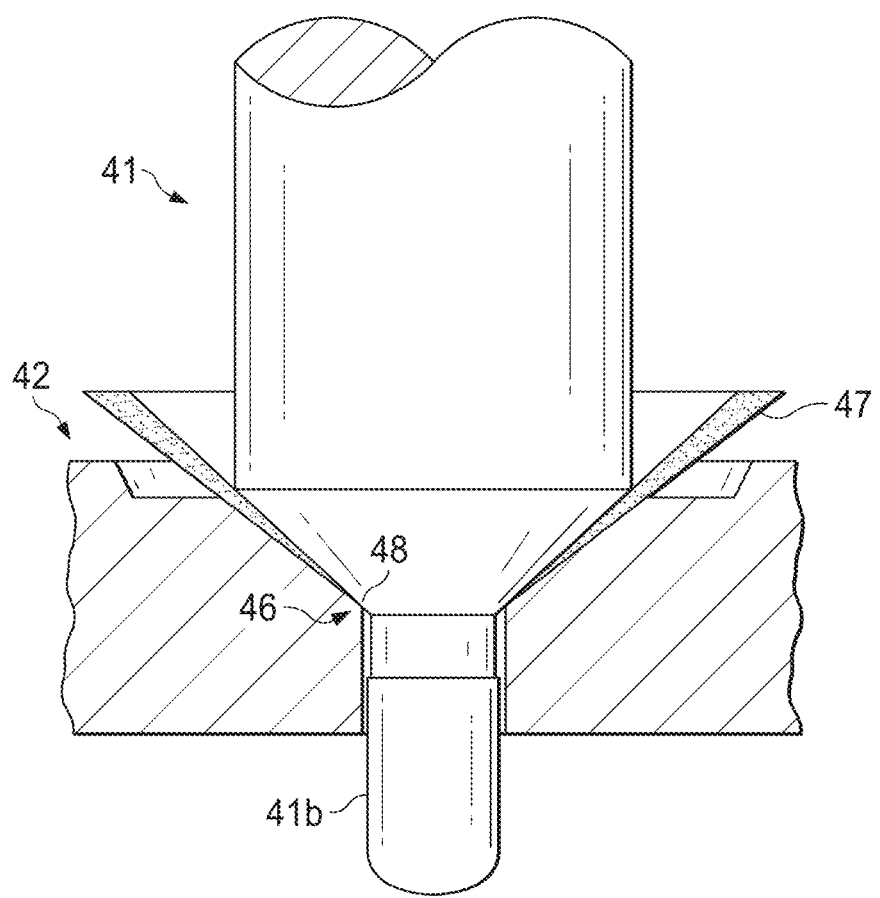
FIG. 5 depicts a schematic view of the portions of the base structure in contact with each other and the cutting-edge material of the present invention.

Between the mating surfaces or interface 46 of each portion 41 and 42 is where a cutting-edge structure 47 of the novel cutting-edge material is formed. In order for the cutting-edge structure 47 to be formed, both upper and lower portions, or the plunger structure and cavity structure, respectively, along with the novel cutting-edge material, have to be present in the base structure 40 and in contact as shown in FIG. 5. The plunger structure is forcefully inserted into the cavity structure. In doing so, there is a line contact 48 that is formed at the interface 46 between the plunger structure and the cavity structure. This line contact 48 is an important aspect of the present invention as the line contact formed at the interface 46 serves to form the sharp tip and edge of the cutting-edge structure 47.

It should be noted that preferably, at least one of portions of the base structure comprises a cylindrical three-dimensional shape to allow for this line contact 48 to be formed. In the present invention, the plunger structure is preferably formed as a generally cylindrical shape and the cavity structure has a conical frustum or trapezoidal shape.

Figure 5A:
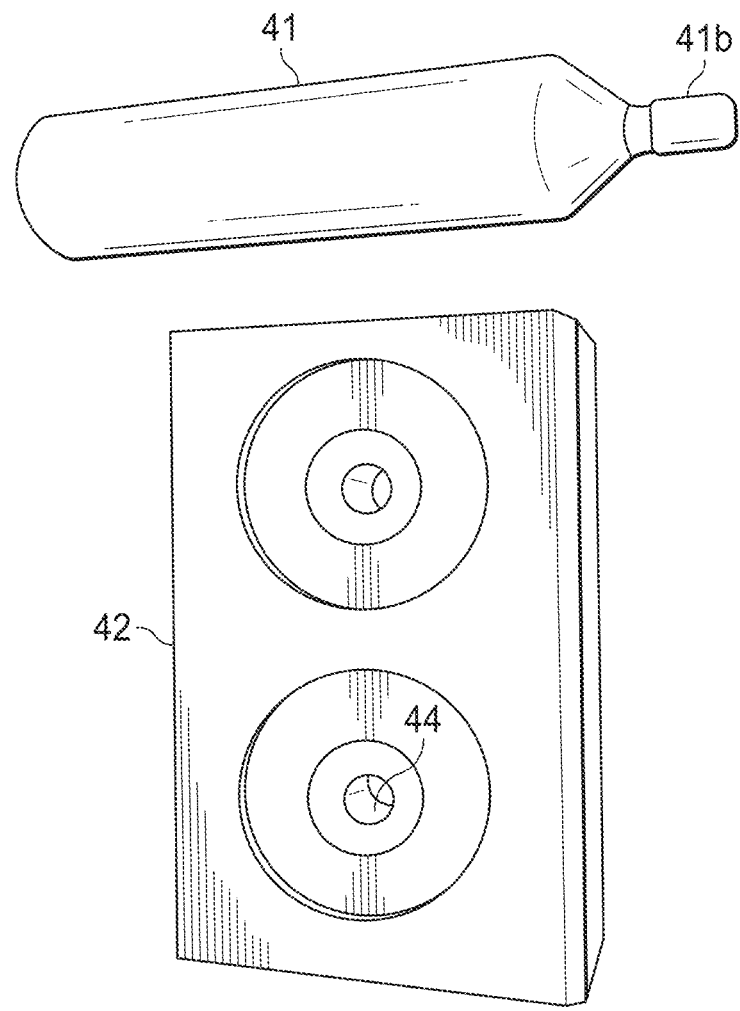
FIG. 5A depicts a photographic image of the portions of the base structure of the present invention.

Exemplary embodiments of discrete components of the base structure, the plunger structure 41 and the cavity structure 42 of the present invention are shown separately in the photographic image in FIG. 5A.

With the pressure from the plunger structure at the aperture 44, a cutting-edge material is pressed, embossed or shaped into a sharp edge. Though any shape is contemplated in the present invention, the cutting-edge structure 47 formed with the base structure 40 having a circular aperture comprises a ring or loop shape. An alternate preferred embodiment showing a base structure forming a linear cutting-edge structure is described and shown in FIG. 8.

Figure 6:
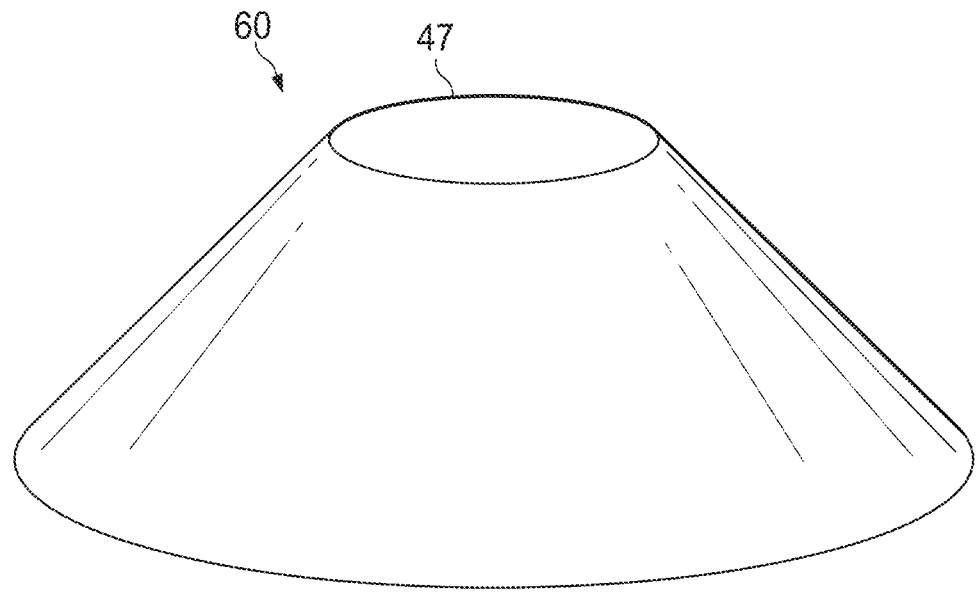
FIG. 6 depicts an illustration of a razor blade cutting-edge structure of the present invention formed using the base structure of FIGS. 4 and 5.

FIG. 6 depicts an illustration of a razor blade cutting edge structure 60 of the present invention and its cutting-edge structure 47 formed utilizing the base structure 40 of FIGS. 4 and 5.

Figure 7:
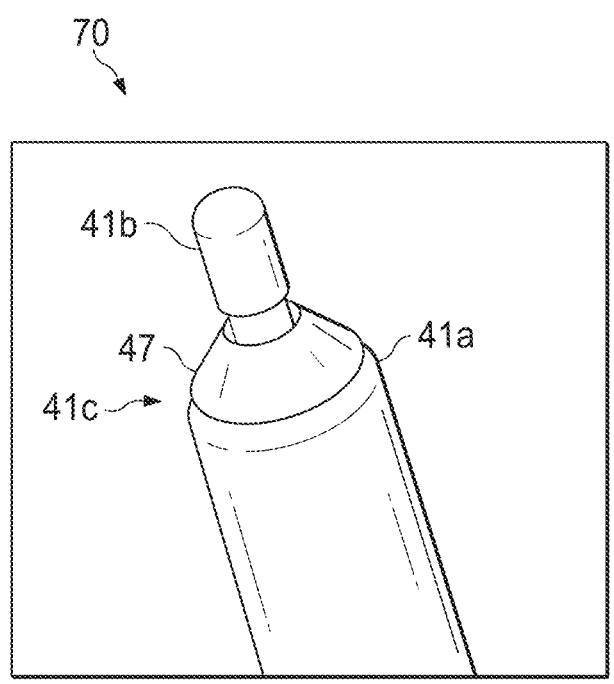
FIG. 7 depicts a photographic image of a portion of the base structure and the cutting-edge structure formed in the present invention.

In FIG. 7, a photographic image 70 depicts an actual separated mold base structure with the removal of the cavity structure showing only the formed cutting-edge structure 47 disposed along angled surfaces 41*c* of the plunger structure 41. The ring or loop shape of the cutting-edge structure 47 is formed. As can be seen in the photographic image 70 in FIG. 7, the cutting-edge structure 47 also comprises a dark brown color. This color is chemically generated, but other colors may be generated in the process of the present invention.

Figure 8:
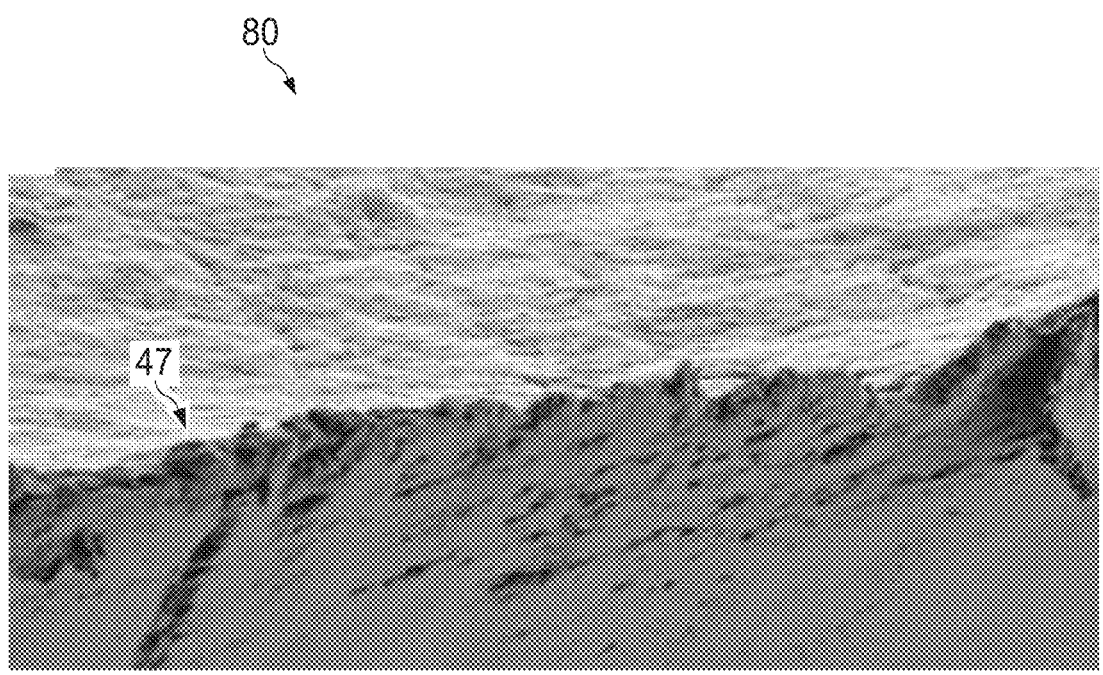
FIG. 8 is a micrograph of a portion of a cutting-edge structure having a loop shape formed of cellulose nanostructure material according to the present invention.

FIG. 8 depicts a micrograph 80 of a portion of the cutting-edge structure 47 produced with the base structure 40 of the present invention utilizing the novel cutting-edge material comprising cellulose nanostructures of the present invention.

As described above, a cutting-edge structure 47 having a loop shape is formed at a line contact 48 formed at the interface 46 of portions 41 and 42.

The present invention also contemplates forming linear cutting-edge structures. To form linear cutting-edge structures, rather than a loop or ring cutting-edge structure, the base structure 90 of the present invention may comprise an upper portion 91 having a cylindrical or rod shape while one or more lower portions 92 comprise a cavity structure of any shape, preferably having a trapezoidal prism shape as shown in the front and perspective views of FIGS. 9A and 9B, respectively. Cavity structures 92 also comprise one or more angled surfaces 93. Angle surfaces 93 comprise angles ranging from about 15 degrees to about 60 degrees, and more preferably ranging from about 20 degrees to about 40 degrees. These angled surfaces 93 of the cavity structure 92 accommodate the cylindrical rod upper portion 91 as well as the novel cutting-edge material, as shown.

Cavity structure 92 and base structure 90 will together form two line contacts 98 (e.g., one on each side) at the interface of their respective surfaces when contacting each other. Thus, in this embodiment, two cutting-edge structures 94*a* and 94*b* (e.g., shown in FIG. 9A), can be formed at this line contact 98, each having a linear shape or a substantially linear shape, and each being formed substantially at the same time. This arrangement may be a time and cost-effective solution as it produces more than one cutting-edge structure at one time. However, as shown in FIG. 9C, an alternate embodiment of a base structure 90*c* of the present invention having an upper portion 91*c* having a cylindrical or rod shape and lower portion 92*c* comprise a cavity structure of any shape, preferably having a trapezoidal prism shape, which may be two-sided, is also contemplated. Cavity structure 92*c* and base structure 90*c* will form a line contact 98*c* at the interface of their respective surfaces contacting each other. Thus, in this embodiment, one cutting-edge structure razor blade 94*c* can be formed at line contact 98*c*.

Figure 9A:
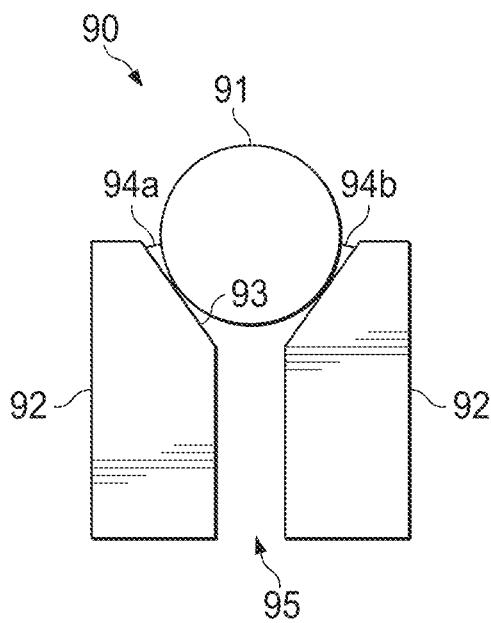
FIGS. 9A and 9B depict illustrations of another embodiment of a base structure of the present invention for forming linear shaped cutting-edge structures.
Figure 9B:
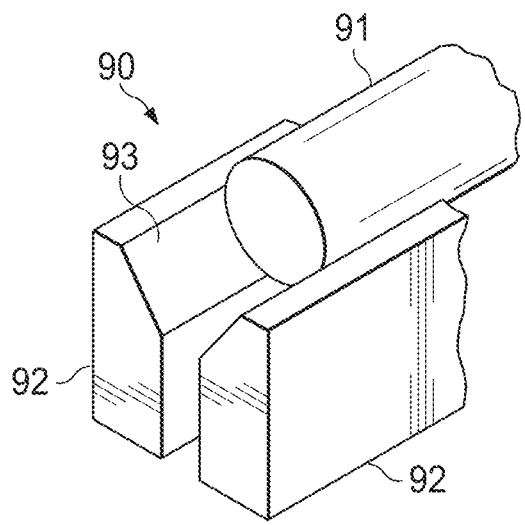
Figure 9C:
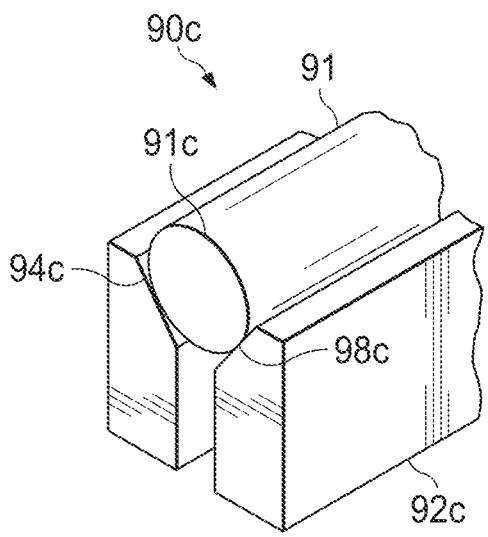
FIG. 9C depicts an illustration of yet another embodiment of a base structure of the present invention for forming linear shaped cutting-edge structures.

In FIGS. 9A-9C, the weight of the upper portion 91*a*, 91*b*, or 91*c* (e.g, cylindrical rod shape) may provide the force that is needed to form the line contact for the linear cutting-edge structures 94, 94*b*, and 94*c*. The rod may be pre-loaded by gravity or be loaded using a press, driven mechanically (e.g., with a spring), or hydraulically. In this way, the rod may be capable of self-aligning due to the nature of the design.

To form the cutting-edge structure 47, the cavity structure is filled with the novel material of the present invention. The processing of the material will be described in conjunction with the flow diagram shown in FIGS. 12A and 12B.

Figure 9D:
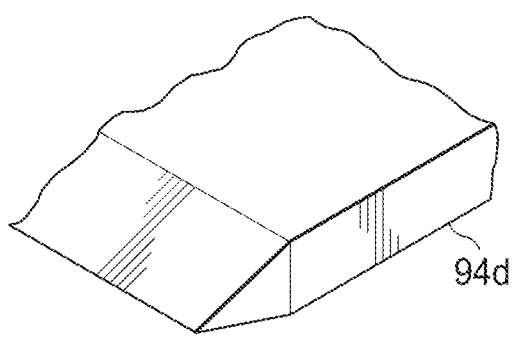
FIG. 9D depicts an illustration of a linear shaped cutting-edge structure of the present invention.

FIG. 9D depicts a linear shaped cutting-edge structure 94*d* of the present invention which is suitable for use with a razor cartridge or blade unit.

Figure 10:
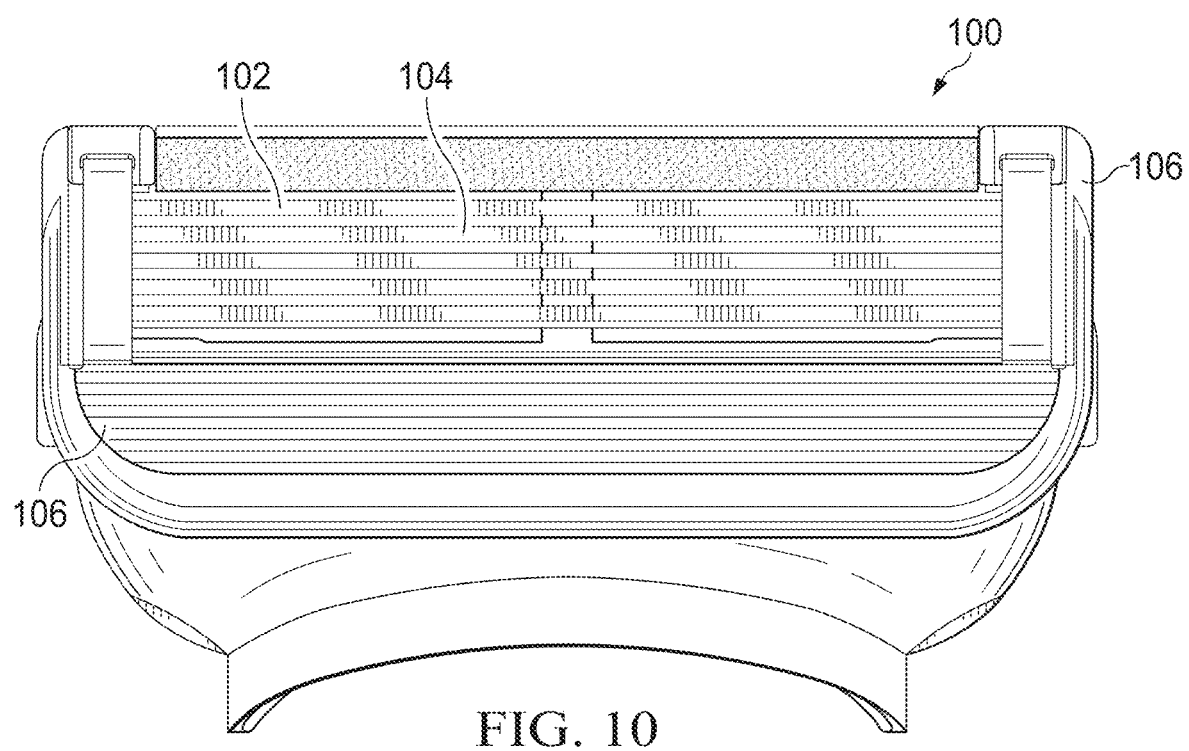
FIG. 10 depicts a razor blade cartridge comprising linear shaped cutting-edge structures of the present invention.

A razor cartridge 100 having one or more cutting-edge structures or razor blades 102 made of cellulose nanostructure (e.g., nanocrystal) materials 104 of the present invention can be assembled as shown in FIG. 10. Cutting edge structures 102 depicted in FIG. 10 are preferably of the linear type as described herein. Razor cartridge 100 is similar to razor cartridges that are commercially available utilizing steel blades and with plastic housing and frame components 106.

Figure 10A:
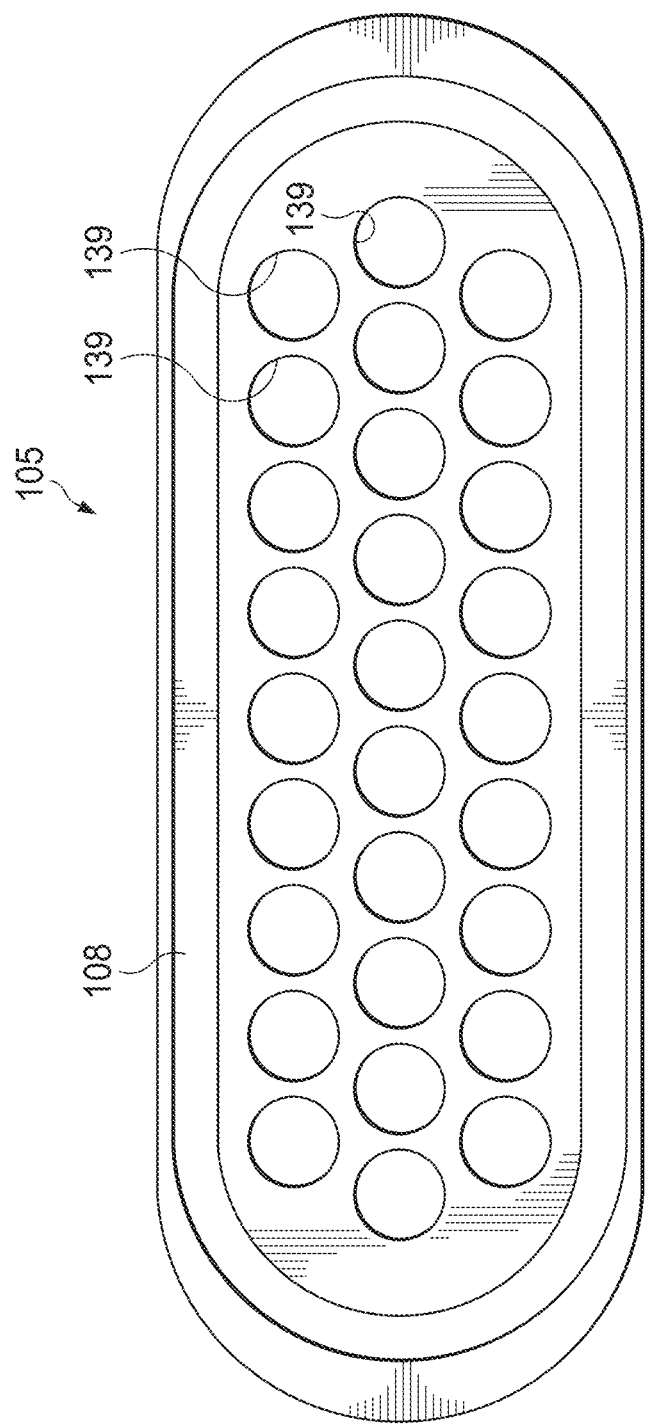
FIG. 10A depicts a razor blade cartridge comprising circular shaped cutting-edge structures of the present invention.

A razor cartridge 105 having one or more cutting-edge structures or razor blades 139 made of cellulose nanostructure (e.g., nanocrystal) materials 110 of the present invention can be assembled as shown in FIG. 10A. Cutting edge structures 139 depicted in FIG. 10A are preferably of the circular shape as described herein. Razor cartridge 105 is similar to razor cartridges that are commercially available utilizing steel blades and with plastic housing and frame components 108.

Process of Making Razor Blade Out of Novel Material

Referring to FIG. 11, and as described above, the novel cutting-edge material 110 of the present invention comprises several components. In a preferred embodiment, the cutting-edge material 110 comprises cellulose nanostructures 112, one or more oligomers or polymers 114, such as an epoxide, and a solvent 116, preferably an organic solvent, and more preferably dimethylformamide.

Desirably, about 90 percent or greater of the material 110 is renewable or sustainable. The cellulose nanostructures 112 generally may represent substantially all of the sustainable or renewable portion of the material 110. The cellulose nanostructures 112 and the solvent 116 together may represent all or substantially all of the sustainable or renewable portion of the material 110. The cellulose nanostructures 112 and the solvent 116 together may account for about 60 percent to about 90 percent of the sustainable or renewable portion of the material 110.

The material 111 may also comprise cross-linkers 115, thermal or ultra-violet (UV) cross-linkers 114, or any combination thereof. The cross-linkers serve to form covalent bonds between the cellulose nanostructure material and the polymer, as well as within the polymer.

The material 111 may also include at least one photoinitiator comprising an ultra-violet light curing photoinitiator, a cationic photoiniatior, a free radical photoinitiator, a thermal photoiniator, or any combination thereof. The thermal photoinitiator desirably comprises polyamine. The cationic photoinitiator preferably comprises an epoxide.

The cutting-edge material 111 of the present invention is desirably in a first state in the form of a physical gel.

Figure 12B:
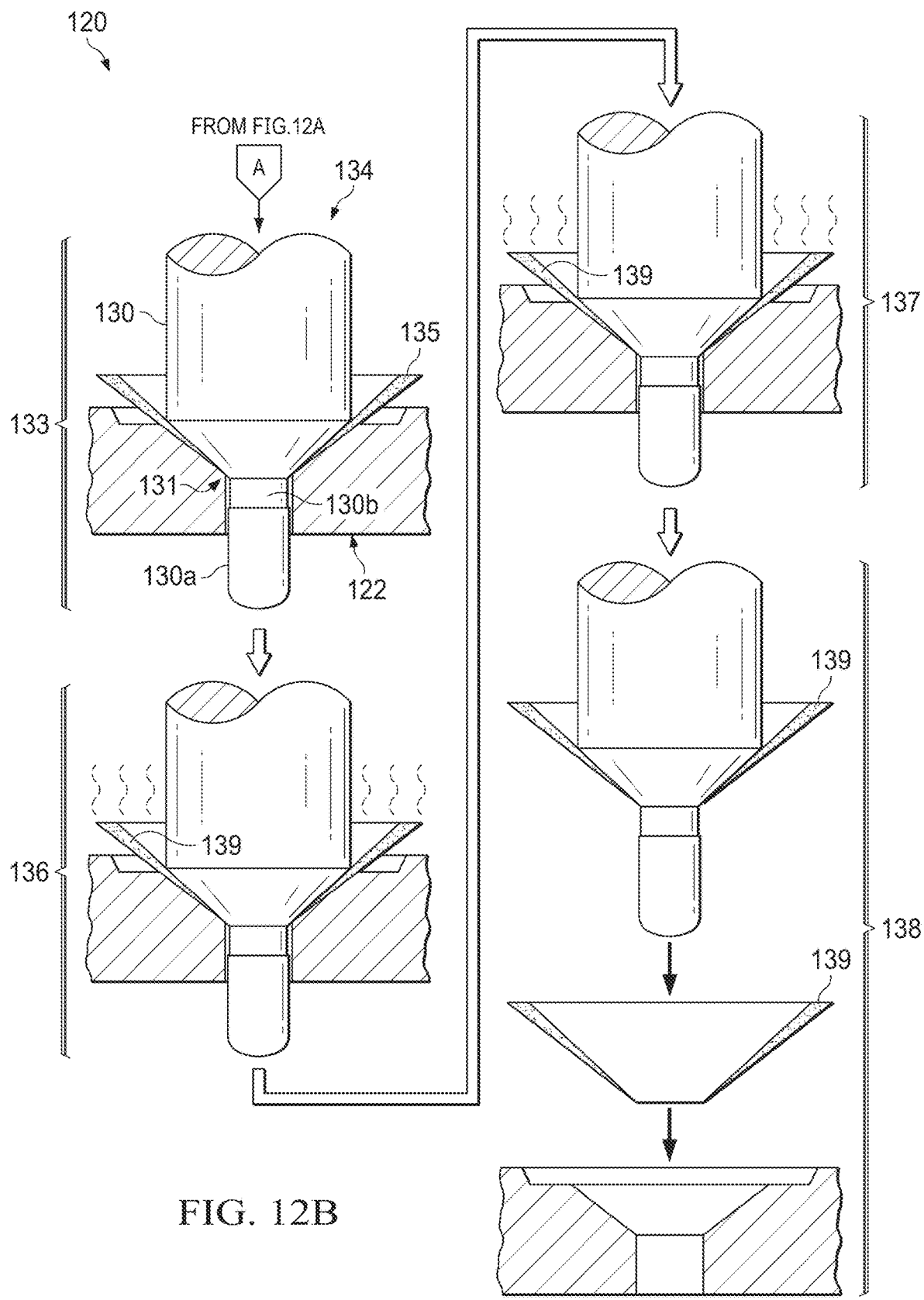

Turning now to FIGS. 12A and 12B, a flow diagram 120 is shown outlining a more detailed description of the processing of the novel cutting-edge material 110 of the present invention to form a cutting-edge structure. The cutting-edge material 110 will transform from its first state as a physical gel to a final state, that of a rigid, solid and sharp cutting-edge structure, such as the exemplary structures described herein.

At step 121, a layer of a physical gel of the cutting-edge material of the present invention is deposited in a lower portion or cavity structure 122. The gel is desirably deposited into an aperture 122b of the cavity structure 122. The aperture 122b may extend throughout the structure 122 in that the structure is open at both ends with a larger mouth at the top area 122c of the cavity structure than at a bottom area 122d of the cavity structure 122. Aperture 122b is shown having a generally circular shape though any shape is contemplated in the present invention.

At step 123, the physical gel is cured. Preferably, the curing that occurs is an ultra-violet curing for a duration of one or more seconds to several minutes, as disclosed in U.S. application Ser. No. 16/711,524 and U.S. application Ser. No. 16/711,539, filed on the same date Dec. 12, 2019 as the present application, and U.S. application Ser. No. 62/780,187 filed on Dec. 14, 2018, entitled "Systems, Devices, and Methods for Bulk Processing of Highly-Loaded Nanocomposites," incorporated herein in its entirety, including specification and drawings.

After curing the physical gel 110, a chemical gel 124 is formed at step 125 within the cavity structure. Steps 121 and 123, of depositing an amount (e.g., a layer) of physical gel and curing it to form a chemical gel, can be repeated at step 126 as many times as necessary to fill the cavity structure with the desired amount of chemical gel to obtain the final structure. Desirably, the final structure has little to substantially no volatile components in part due to evaporation of any volatile material resulting in convective flows once the plunger is inserted into the cavity structure thereby forming the chemical gel.

The chemical gel 124 of the present invention is comprised of cellulose nanocrystals, and polymer that are partially covalently bonded. The chemical gel also comprises solvent. The chemical gel 124 is considered a viscoelastic solid structure. This structure is desirable in the present invention because it is capable of being molded into one or more shapes.

At step 127, the solvent within the chemical gel is evaporated by drying the chemical gel at room temperature in air or in vacuum. As a result, a dried chemical gel 128 is formed. This process step is desirable (e.g., to remove the solvent by evaporation) as it was determined in a novel aspect of the present invention process that removal of the solvent minimizes microscale phase separation and volumetric shrinkage in the next step of cure.

At step 129, the plunger structure 130 is inserted, desirably at room temperature, into the aperture 122b of the cavity structure and contacts the dried chemical gel 128. The plunger structure 130 is press fit or embossed into the cavity structure 122 and plunger element 130a at the front of the plunger structure is shaped to assist in wedging the plunger structure 130 into the aperture 122b while abutting the angled surfaces 122a of the cavity structure 122.

A line contact 131 is formed at the interface 132 between the plunger structure and the cavity structure at step 133. The line contact may generally be at the surface of the aperture of the cavity structure. As can be seen at step 133 which depicts a front and perspective front view of the base structure 134, a cutting-edge structure 135 has now been formed from the dried chemical gel 128.

The plunger structure 130 is inserted with sufficient force to form or mold the dried chemical gel into the sharp shape of a cutting-edge structure having a loop or ring shape of the present invention. Relief portion 130b ensures that the dried chemical gel is embossed down to a point assisting in obtaining the cutting-edge structure with a desired tip radius (e.g., less than 1 μm) for optimal shaving performance. In addition, any remaining dried chemical gel 128 displaced by the plunger structure may remain in the inner walls of the plunger or cavity structure or may be displaced externally to the structures. Any remaining dried chemical gel 128 (not shown), not a part of the cutting-edge structure, can be disposed of, recycled, or optionally cured using the process herein as a reference specimen.

Depending on the design of the base or mold structure, any cutting-edge structure shape can be produced. The present invention contemplates that a loop shaped cutting-edge structure, a linear cutting-edge structure or any combination thereof, can be formed using the process described herein.

Subsequently, at step 136, the formed dried chemical gel (now cutting-edge structure 135) is heated from room temperature (e.g., 25 degrees Celsius) to about 180 degrees Celsius to complete the curing and completely harden the cutting-edge structure.

This heating step 136 may occur in several steps of varying duration where the temperature is incrementally increased. For instance, the temperature may rise from room temperature to about 50 degrees Celsius to about 100 degrees Celsius, preferably about 80 degrees Celsius, and in a subsequent step, from 80 degrees Celsius to about 120 degrees Celsius. This dual stage thermal cure can be performed at different durations. For instance, as shown in FIG. 12, a first heating step 136 may occur at 80 degrees Celsius and may have a duration of about 8 hours while a second heating step 137 may occur at 130 degrees Celsius and may have a duration of about 4 hours.

Optionally, steps 136 and 137 can be performed in an autoclave at pressure greater than atmospheric pressure to ensure further compaction of the material 135 forming the final cutting-edge structure 139.

The tip radius of the cutting-edge structure produced by the present invention process is desirably in the range of less than about 1 micrometer. The hardness of the cutting-edge structure formed, such may reach greater than 100 MPa, preferably greater than 500 MPa after curing.

Due to the nanoscale structure of the desired cutting-edge, shrinkage is not desirable. Accordingly, the avoidance of shrinkage and phase separation is an important consideration and is achieved by several process steps described herein. For instance, step 123 (e.g., the curing of the physical gel material to form a chemical gel material), step 127 (e.g., vacuum/evaporation of solvent) and steps 136 and 137 (final cure by heating) each or together assist in providing a final structure with minimal shrinkage and phase separation.

At step 138, the plunger structure and the cavity structure can be separated to extract the molded cutting-edge structure 139. As the two portions were joined or contacted together by force, the base structure generally has to be opened or split apart in order to remove the cutting-edge structure 139.

The final cutting-edge structure 139 can be inserted into a razor cartridge for use in shaving. FIGS. 10 and 10A depict multiple final cutting-edge structures of the linear type and the circular type, respectively inserted into a razor cartridge 100 and 120.

After final cutting-edge structure 139 is formed and prior to insertion into a razor cartridge, the final cutting edge structure 139, which may be circular shaped as shown in FIG. 12B or of any shape (e.g., linear shaped as in FIG. 10), may be coated with one or more materials. As shown in FIG. 14A, one or more hard coatings 174 can be applied on the cutting-edge structure 172 as shown in the group 170 of multiple cutting edge structures. The hard coating provides additional strength to structure or to provide a radius of curvature of the blade edge between about 20 nanometers and about 100 nanometers after deposition of the hard coating. The hard coating can comprise diamond, diamond-like carbon, amorphous diamond, boron nitride, niobium nitride, silicon nitride, chromium nitride, zirconium nitride, titanium nitride, silicon carbide, alumina, zirconia, or any combination thereof.

Figure 14:
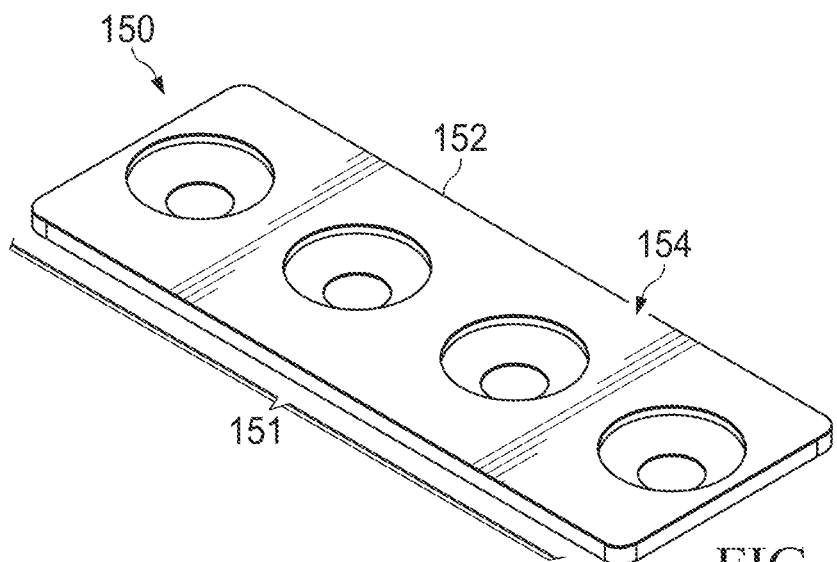
FIG. 14 depicts multiple cutting-edge structures formed as a group in accordance with the present invention.
Figure 14A:
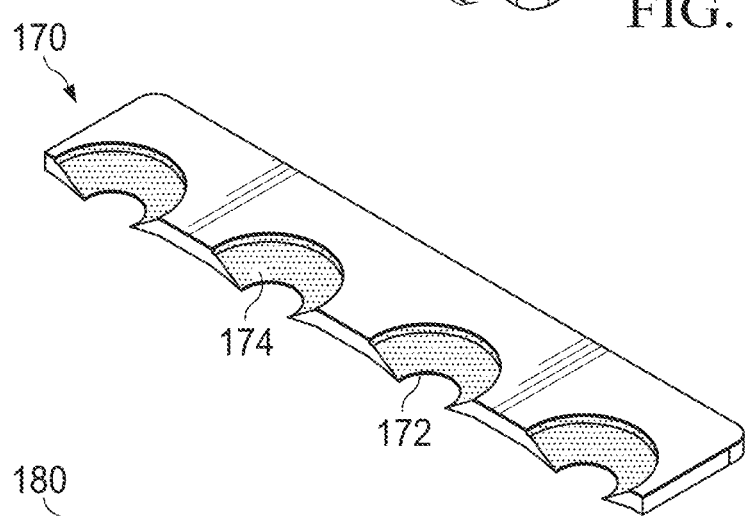
FIGS. 14A and 14B depict coatings deposited on cutting-edge structures in accordance with the present invention.
Figure 14B:
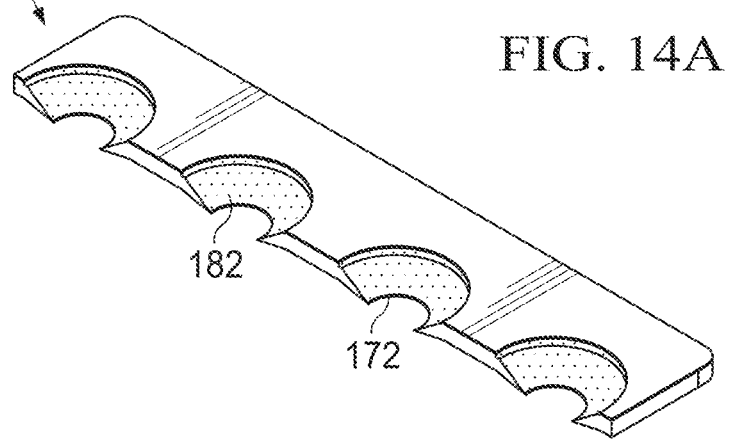

As shown in the group 180 of multiple cutting-edge structures of FIG. 14B, one or more soft coatings 182 can also be deposited on a cutting-edge structure 172 on all or some portion of the hard coating 174 of FIG. 14A. The soft coating may be an outer layer on the cutting-edge structure and is used to provide reduced friction during shaving. The soft outer layer may be a polymer composition or a modified polymer composition. The polymer composition may be polyfluorocarbon. A suitable polyflourocarbon is polytetrafluoroethylene (PTFE), sometimes referred to as a telomer. This material is a nonflammable and stable dry lubricant that consists of small particles that yield stable dispersions. It may generally be furnished as an aqueous dispersion of about 20% solids by weight and can be applied by dipping, spraying, or brushing, and can thereafter be air dried or melt coated. The final cutting-edge structure of the razor blades of the present invention may be heated prior to application of the soft coating/outer layer. In one embodiment, the cellulose nanocrystal-based razor blades are heated to about 120 degrees Celsius before an aqueous dispersion of PTFE is spray coated thereon. The soft coating layer is preferably less than about 5,000 angstroms and could typically be about 1,500 angstroms to about 4,000 angstroms, and can be as thin as about 100 angstroms, provided that a continuous coating is maintained.

While the methods of manufacturing described herein have been referred to with primary reference to a single cutting-edge structure (e.g., razor blade), the methods are easily applicable to the manufacture of multiple cutting-edge structures simultaneously.

Figure 13A:
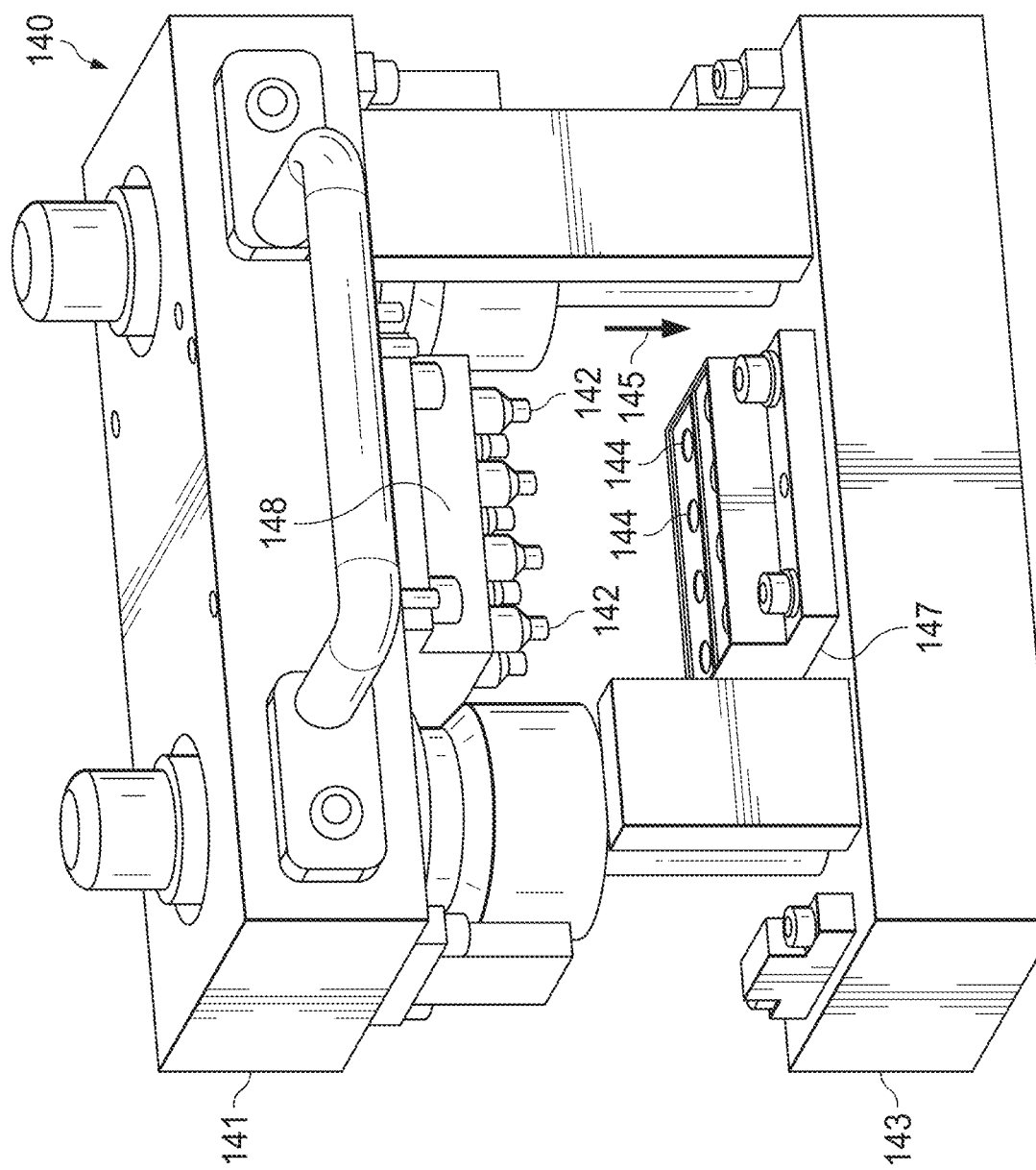
FIGS. 13A to 13C depict schematic diagrams of an alternate base structure of the present invention.
Figure 13B:
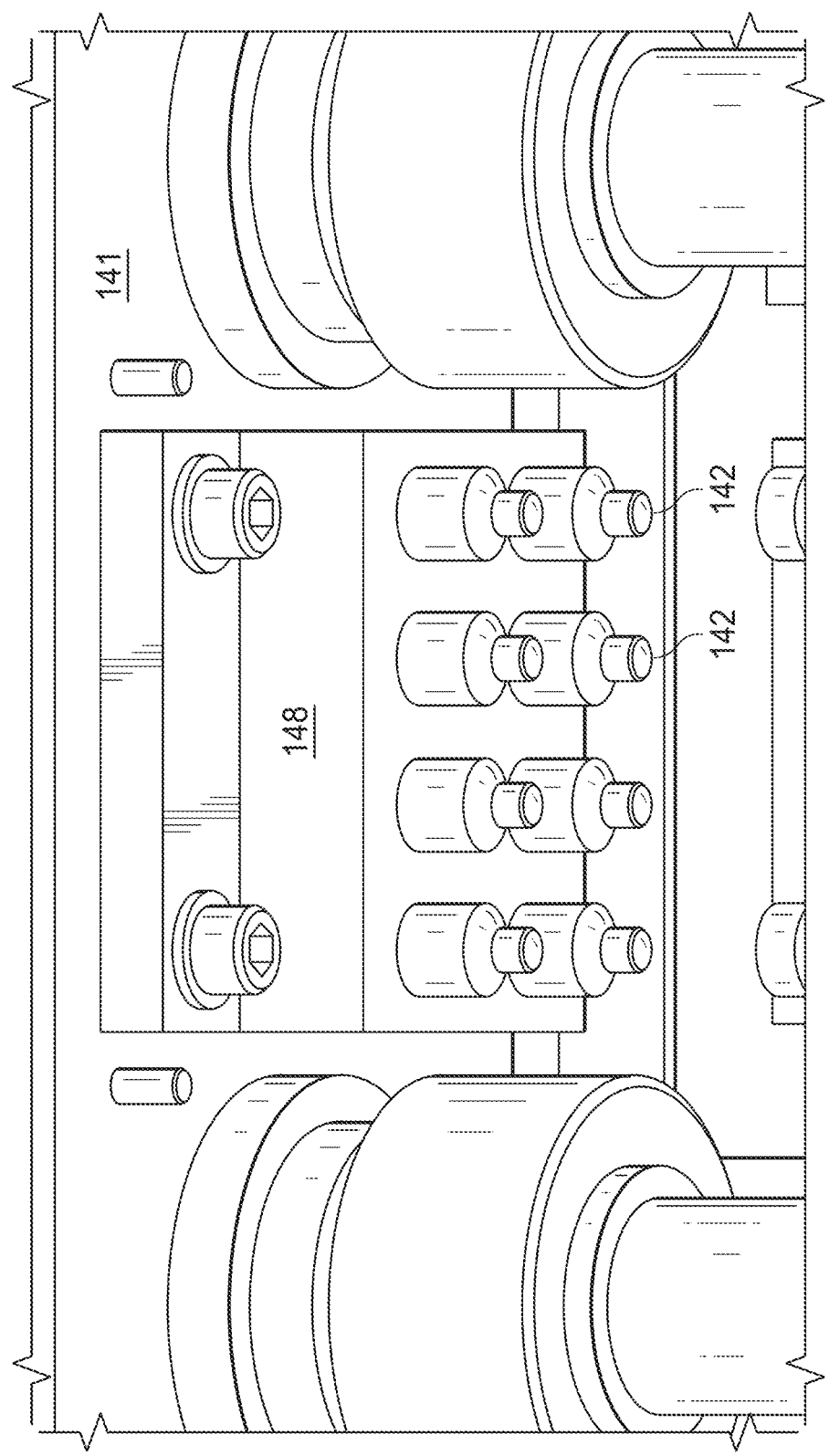
Figure 13C:
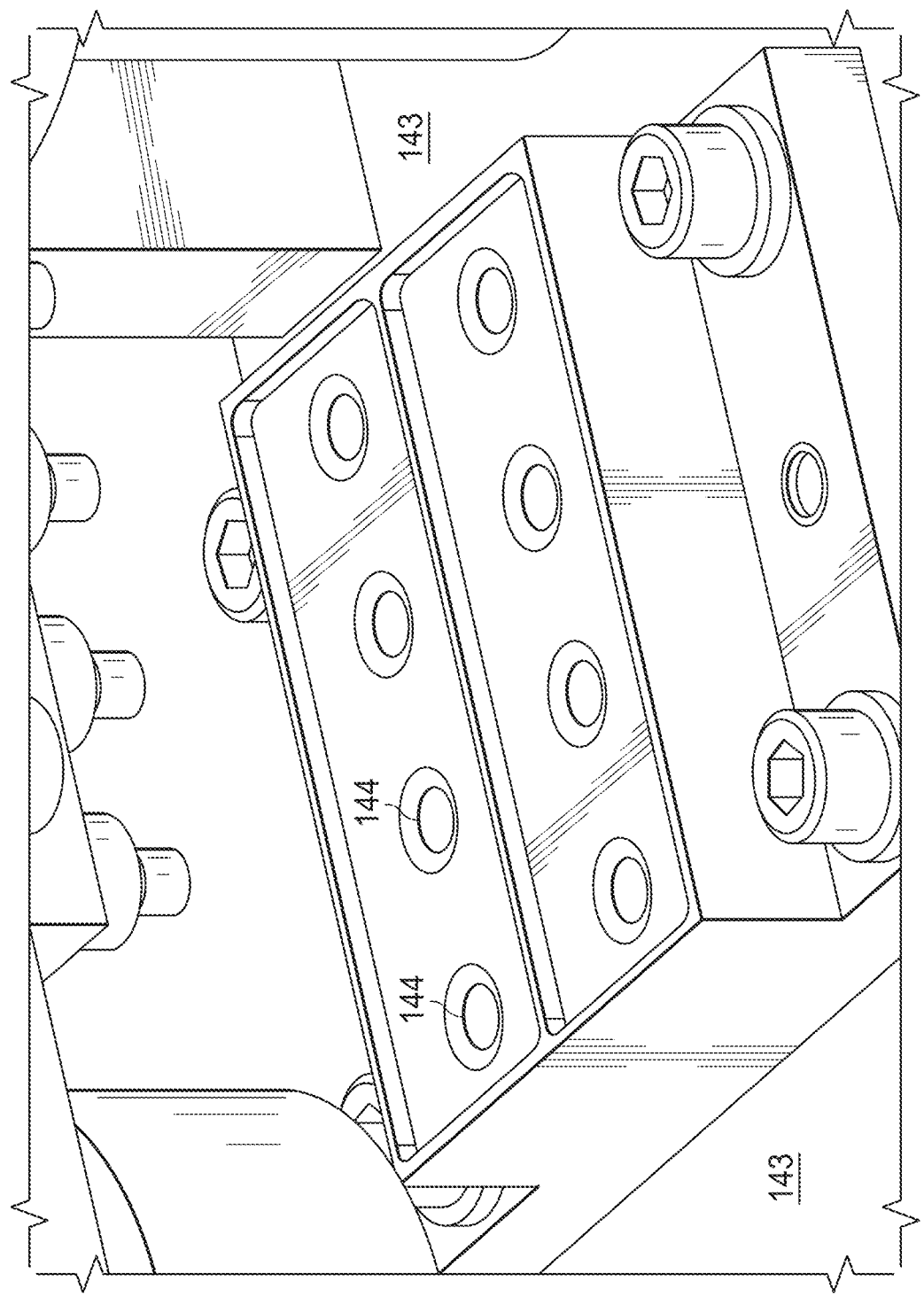

Turning now to FIGS. 13A to 13C, an alternate base structure 140 of the present invention is shown. Depicted in FIGS. 13A to 13C is a base structure 140 having multiple plunger structures 142 and multiple cavity structures 144. Base structure 140 includes an upper main platform 141, on which an upper base portion 148 is disposed which carries the plunger structures 142. As shown, the eight plunger structures are all contained within upper base portion 148. Base structure 140 includes a lower main platform 143, on which a lower base portion 147 is disposed which carries the eight cavity structures 144. As shown, the eight cavity structures 144 are all contained within lower base portion 147.

In FIGS. 13A to 13C, a base structure incorporates eight plunger structures 142 and eight cavity structures 144 which are utilized in accordance with the methods described herein. Manufacture of the plurality of cutting-edge structures (e.g., razor blades) follows the process of FIG. 12A and FIG. 12B but would necessarily include more cutting-edge material (not shown), filling each of the eight individual cavity structures 144, and then pressed into the cavity structure by the plunger structures aligned above them. The pressing force occurs at the same time (if more than one) or in sequence (if only one). With this forceful insertion, the plunger structures substantially simultaneously emboss the cutting-edge material which in turn, produces several sharp cutting-edges. After such a "batch" manufacture of the plurality of cutting-edge structures such as razor blades within the base structure, the cutting-edge structures may be separated as described above in conjunction with FIG. 12A and FIG. 12B in preparation for further assembly into razor cartridges. It should be noted that the size of the base structure 140 can vary depending on the size of the cutting-edge structures desired, and generally may be larger than the base structure utilized for forming a single cutting edge-structure as described in conjunction with FIG. 12A and FIG. 12B.

Figure 15:
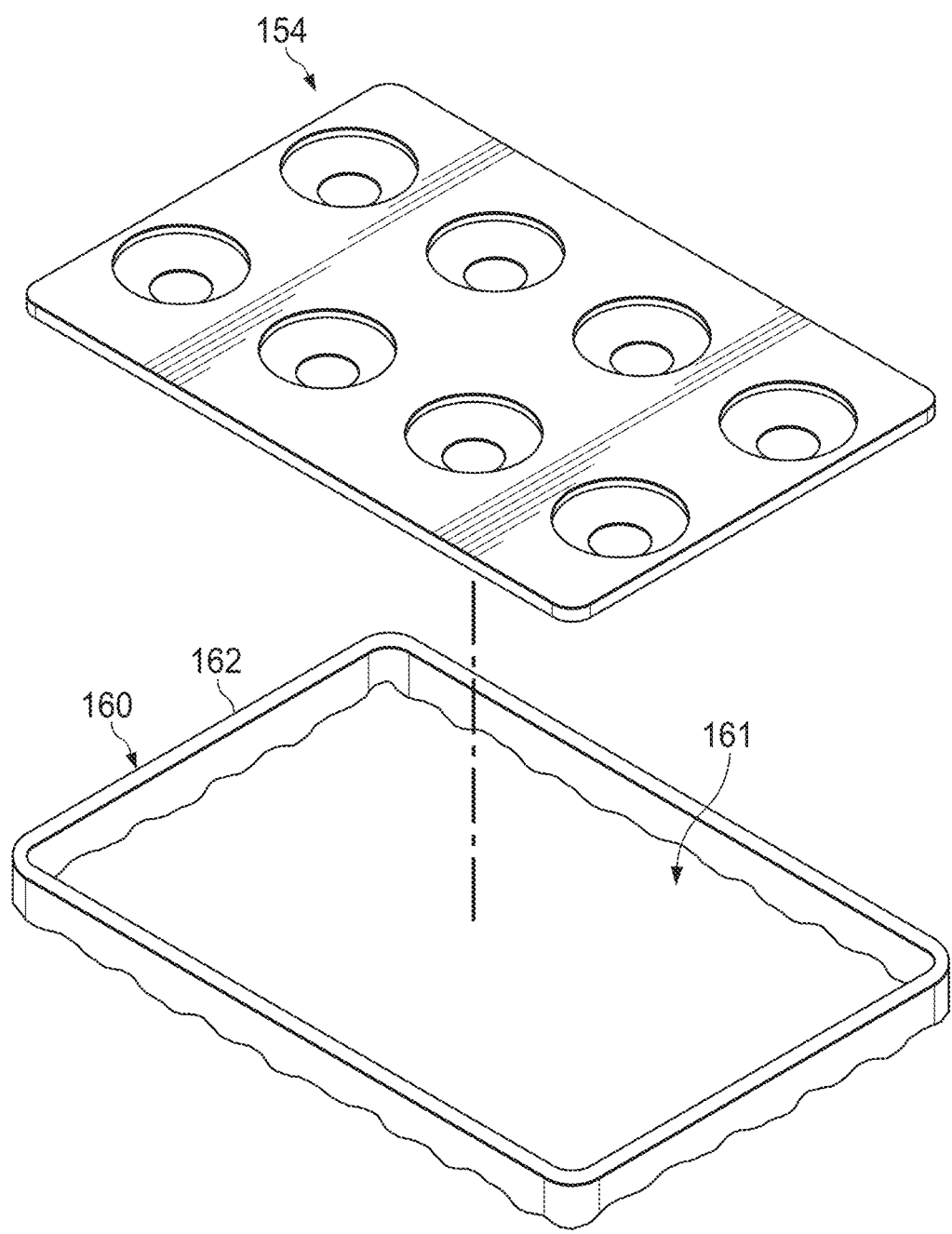
FIG. 15 depicts multiple cutting-edge structures formed as a group inserted into a razor cartridge in accordance with the present invention.

Turning to FIG. 14, a plurality of razor blades may be formed in groups 150, e.g., clustered together in groups of multiple cutting-edge structures 151, within a small frame 152. The frame 152 is a non-cutting-edge structure while the razor blades are cutting-edge structures. The frame has a generally rectangular shape and for ease in discussion are referred to herein as blade boxes 154. The plurality of razor blades 150 can be manufactured in this clustered organization to reduce downstream process steps in the shaving razor system assembly. The blade boxes 150 may have four individual razor blades 151, as illustrated, enclosed by a frame 152. Blade boxes 154 can be manufactured identically or they can be different, such as each box having differences in blade spacing, included blade angles, number of blades, orientation of the blades, and the like. The differences can be made via changes to the various method steps described above, such as utilizing different templates and pressing in different orientations, and the like. A blade box 154 can be removed from the base structure 140 or any of the upper or lower portions in the same manner as described above, but such that the self-contained blade box 154 is a singular unitary part. In FIG. 15, a blade box 154 of the present invention is inserted into an opening 161 in the housing 162 of a razor cartridge 160 and secured therein or be formed into a razor cartridge entirely at the outset (not shown).

Assembling the razor cartridge in such a manner eliminates the somewhat time consuming or difficult steps of affixing each individual razor blade to a blade support or to a housing, inserting each blade support-razor blade pair or each blade in the razor cartridge housing, and aligning each separate razor blade to the desired blade height, angle, and spacing. By utilizing the method described herein, the plurality of razor blades are aligned and secured in the blade box, thereby eliminating the need to affix individual blade supports and the difficult process of aligning 4 or more separate razor blades into the razor cartridge housing. While FIGS. 14 and 15 illustrate blade boxes 154 having 4 razor blades, it is to be understood that any number of razor blades can be clustered or formed together, such as 2, 4, 5, or more.

As mentioned, while the blades illustrated in the figures thus far have described circular and linear cutting-edge structures (e.g., razor blade edges), other blade shapes and edge patterns can be produced by the methods described herein including a mixture of different cutting-edge structure shapes formed within one "blade box."

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for manufacturing at least one cutting-edge structure comprising:
    a first part and a second part and cutting edge material disposed therebetween, the cutting edge material comprising a naturally derived material comprising cellulose nanocrystals.

2. The apparatus of claim 1 wherein one of said parts comprises a cylindrical shape.

3. The apparatus of claim 1 wherein said first part is a plunger structure.

4. The apparatus of claim 1 wherein said second part is a cavity structure.

5. The apparatus of claim 3 wherein said plunger structure further comprises a plunger element and a plunger body.

6. The apparatus of claim 5 wherein said plunger structure further comprises a relief portion.

7. The apparatus of claim 6 wherein said relief portion is disposed between said plunger body and said plunger element.

8. The apparatus of claim 7 wherein said relief portion provides a point or line contact between a plunger structure and a cavity structure to mold said naturally derived material into a cutting-edge structure.

9. The apparatus of claim 3 wherein said plunger structure further comprises an angled portion.

10. The apparatus of claim 3 wherein at least a portion of said plunger structure comprises a cylindrical shape.

11. The apparatus of claim 3 wherein said plunger structure comprises one or more lubricious materials, one or more plastic materials, one or more metals, or any combinations thereof.

12. The apparatus of claim 11 wherein said lubricious material comprises Teflon.

13. The apparatus of claim 4 wherein said cavity structure comprises an aperture.

14. The apparatus of claim 13 wherein said aperture extends through the cavity structure.

15. The apparatus of claim 13 wherein said cavity comprises a circular shape.

16. The apparatus of claim 4 wherein said cavity structure comprises angled surfaces.

17. The apparatus of claim 1 wherein said first portion, said second portion, or both said first portion and second portion comprise one or more lubricious materials, one or more plastic materials, one or more metals, or any combinations thereof.

18. The apparatus of claim 17 wherein said lubricious material comprises Teflon.

19. The apparatus of claim 1, wherein the cutting edge material further comprises a polymeric material.

20. The apparatus of claim 19, wherein the polymeric material is an epoxide obtained from a naturally derived, renewable, or biodegradable source.

* * * * *